(12) United States Patent
Heikkinen et al.

(10) Patent No.: US 12,515,481 B2
(45) Date of Patent: Jan. 6, 2026

(54) STUDDED TYRE FOR VEHICLES

(71) Applicant: NOKIAN RENKAAT OYJ, Nokia (FI)

(72) Inventors: Lauri Heikkinen, Nokia (FI); Mikko Liukkula, Nokia (FI); Aappo Laitila, Nokia (FI)

(73) Assignee: NOKIAN RENKAAT OYJ, Nokia (FI)

( * ) Notice: Subject to any disclaimer, the term of this patent is extended or adjusted under 35 U.S.C. 154(b) by 0 days.

(21) Appl. No.: 18/654,183

(22) Filed: May 3, 2024

(65) Prior Publication Data

US 2024/0375453 A1 Nov. 14, 2024

(30) Foreign Application Priority Data

May 8, 2023 (EP) ..................................... 23172086

(51) Int. Cl.
*B60C 11/16* (2006.01)
(52) U.S. Cl.
CPC ...... *B60C 11/1625* (2013.01); *B60C 11/1675* (2013.01)
(58) Field of Classification Search
CPC .............................. B60C 11/14; B60C 11/16
See application file for complete search history.

(56) References Cited

U.S. PATENT DOCUMENTS

| | | | | |
|---|---|---|---|---|
| 5,355,922 A | * | 10/1994 | Kogure | ..................... B60C 9/26 |
| | | | | 152/526 |
| 2015/0375572 A1 | | 12/2015 | Endo | |
| 2017/0368889 A1 | * | 12/2017 | Ajoviita | ................. B60C 11/16 |
| 2020/0324579 A1 | * | 10/2020 | Pons | ................... B60C 11/1637 |

FOREIGN PATENT DOCUMENTS

| | | | | |
|---|---|---|---|---|
| CN | 108394235 A | * | 8/2018 | .............. B23P 19/06 |
| EP | 2402178 A1 | * | 1/2012 | ......... B60C 11/0302 |
| EP | 3538384 A1 | * | 9/2019 | ......... B60C 11/1637 |
| JP | 2009166806 A | * | 7/2009 | |
| JP | 2015039898 A | * | 3/2015 | |
| RU | 2748476 C2 | * | 5/2021 | ........... B60C 11/005 |
| WO | 2022030610 A1 | | 2/2022 | |

OTHER PUBLICATIONS

Extended European Search Report dated Oct. 19, 2023 for EP Application No. 23172086.3 (7 pages).
"Technical requirements for and type-approval of studded tyres for vehicles" TRAFICOM, 2019 (15 pages).

* cited by examiner

*Primary Examiner* — Blaine Copenheaver
*Assistant Examiner* — Thomas Frank Schneider
(74) *Attorney, Agent, or Firm* — Merchant & Gould P.C.

(57) ABSTRACT

A tyre (200) includes a tread (210) having tread blocks (220); a plurality of stud holes (250); and a plurality of studs (100) installed in at least some of the stud holes (250). Studs (100*b*) in a centre area (CR) of the tyre (200) have higher protrusion from a surface of the tread block (220) than studs (100*a*) in a shoulder area (SR1, SR2) of the tyre (200).

15 Claims, 11 Drawing Sheets

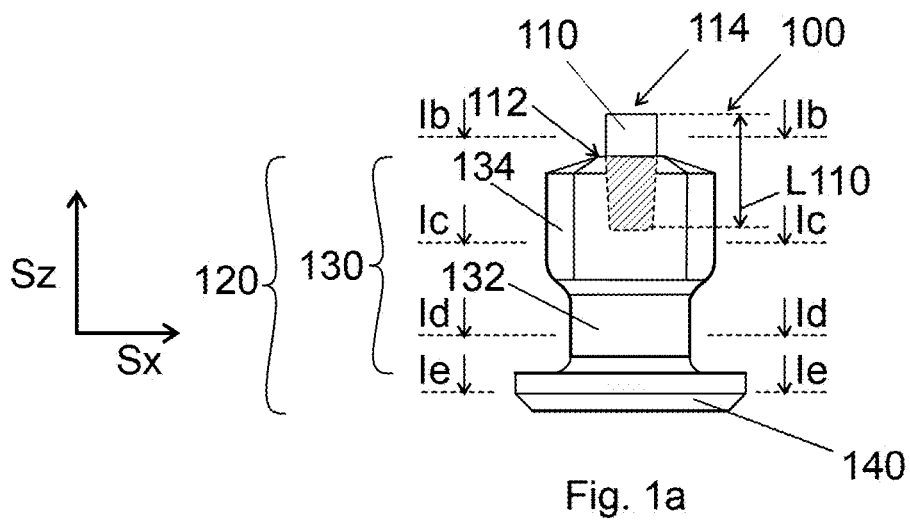
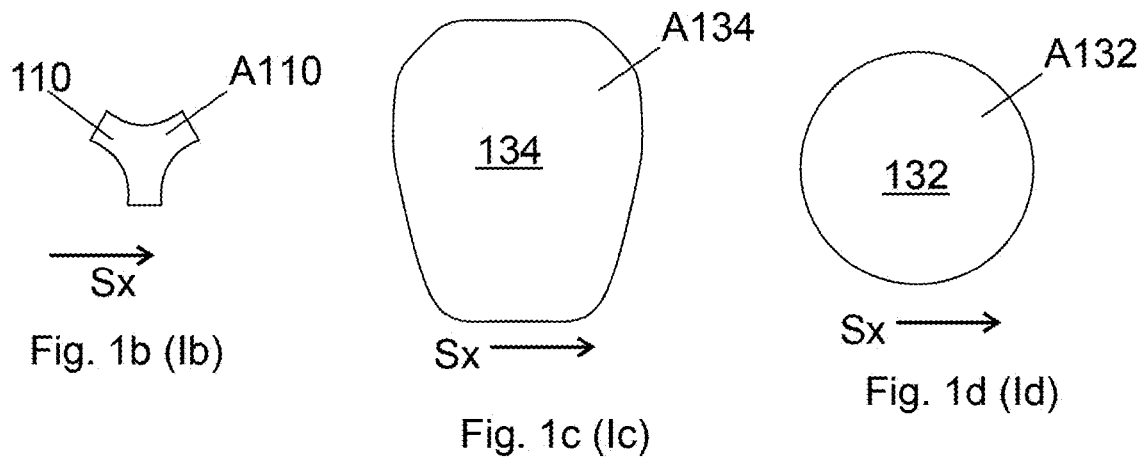
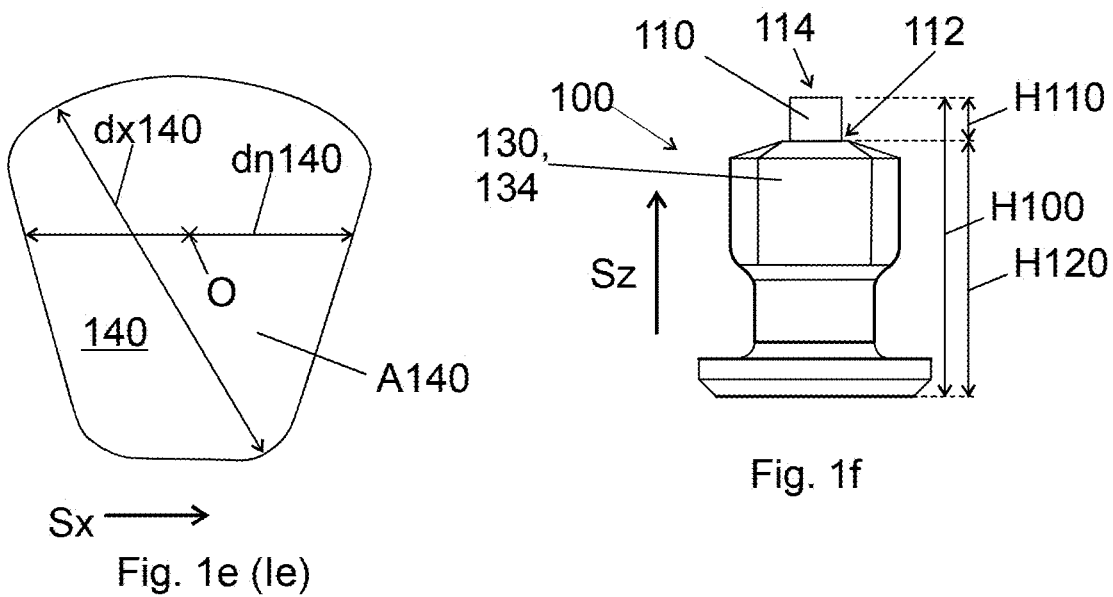

A210=A220+A230

STUDDED TYRE FOR VEHICLES

TECHNICAL FIELD

The invention relates to studded tyres. The invention relates to studded pneumatic tyres. The invention relates to studded pneumatic tyres for passenger car vehicles.

BACKGROUND

Functions of a tyre on an automotive vehicle include providing sufficient traction for accelerating, driving, and braking; and providing adequate steering control particularly at high speeds. Traction is commonly referred to as grip and steering control as handling. Grip is affected also by the ground (e.g. a road surface) on which the tyre is commonly used. Winter tyres, which are intended for icy and snowy (wintry) roads, are commonly equipped with studs to improve grip on ice. However, studs of the studded tyres wear during use and the grip may become worse compared to new, unused studded tyres.

SUMMARY

An aim of the present invention is to provide a studded tyre which provides for good grip within a reasonable lifetime of the tyre. In other words, the grip of the studded tyre is maintained at a good level also when the tyre has been in use for a long time.

According to a first aspect of the invention, a studded tyre is presented, comprising a tread having a plurality of tread blocks, a plurality of studs installed in at least some of the tread blocks, wherein studs at a centre area have higher protrusion from the surface of the tread block than studs in a shoulder area of the tyre.

The tread blocks may be arranged in a periodic fashion called as a pitch. In other words, similar sequence of such a group of tread blocks of one pitch may be repeated over the whole circumference of the tyre. In other words, each pitch includes a predetermined geometry of whole and/or partial tread blocks. The number of tread blocks in each pitch may vary in width across the tire. There may be several different pitches, with variable dimensions or geometry.

In accordance with an embodiment, the configuration of the studs is such that the protrusion of studs in the centre area is in a range from 0.8 mm to 1.6 mm, preferably 0.9 mm to 1.4 mm, most preferably 1.0 mm to 1.3 mm and the protrusion of studs in the shoulder areas is in a range from 0.6 mm to 1.3 mm, preferably 0.6 mm to 1.2 mm, most preferably 0.6 mm to 0.9 mm so that the studs at the centre area have higher protrusion than studs in the shoulder area.

According to an example, the protrusion of a majority of the studs in the centre area of the tyre is in the range from 1.0 to 1.3 mm and the protrusion of a majority of the studs in the shoulder area of the tyre is in the range from 0.8 to 1.0 so that the protrusion of the studs in the centre area are 0.2 or at least 0.1 mm higher than the protrusion of the studs in the shoulder area. According to another example, the average protrusion of the studs in the centre area of the tyre is in the range from 1.0 to 1.3 mm and the average protrusion of the studs in the shoulder area of the tyre is in the range from 0.8 to 1.0 so that the protrusion of the studs in the centre area are 0.2 or at least 0.1 mm higher than the protrusion of the studs in the shoulder area. According to yet another example, the protrusion of studs in the centre area is in the range from 1.1 to 1.2 mm and the protrusion of studs in the shoulder areas is in the range from 0.9 to 1.0 mm. According to still another example, the protrusion of studs in the centre area is in the range from 0.9 to 1.0 mm and the protrusion of studs in the shoulder areas is in the range from 0.8 to 1.0 mm so that the protrusion of the studs in the centre area are 0.2 or at least 0.1 mm higher than the protrusion of the studs in the shoulder area.

In accordance with an embodiment, the higher protrusion in the centre area is achieved by using in a centre area studs in which a pin of the stud is longer than in studs in the shoulder area.

In accordance with an embodiment, the higher protrusion in the centre area is achieved by using similar studs in both centre area and shoulder areas but using stud holes having different depths in the centre area than in the shoulder areas.

In accordance with an embodiment, the higher protrusion in the centre area is achieved by using longer studs in the centre area than studs in the shoulder area, although the pin of each stud may have substantially equal length.

Within this description the term tyre refers to a tyre configured to be used on a wheel of a car, especially a passenger car. In line with this, within this description, a road wear of the studded tyre is defined as the road wear in the test specified in the standard SFS7503:2022:en, which concerns primarily tyres designed for vehicles in categories M1 and N1, as defined in the Consolidated Resolution on the Construction of Vehicles (R.E.3), document ECE/TRANS/WP.29/78/Rev.4, para. 2. These categories are:

M1: Vehicles used for the carriage of passengers and comprising not more than eight seats in addition to the driver's seat, N1: Vehicles used for the carriage of goods and having a maximum mass not exceeding 3.5 tonnes.

The standard SFS7503:2022:en specifies the test procedure in detail. On the general level, in the test, a vehicle equipped with the tyres to be tested is driven over test specimens (i.e. test stones) with specified speed for a specific number of times. The test requires that two identical tyres are tested simultaneously; they are used on one side of the vehicle in the test. According to the standard, a properly loaded vehicle is driven two-hundred times over the test stones at the speed of 100 km/h. As both the front and rear wheel pass the test stones, there are a total of four hundred passes of the test tyres over the test stones; and these passes cause the test stones to wear. Road wear according to the standard SFS7503:2022:en is the average weight loss of three test stone rows compensated by the weight loss of reference stones, if applicable. For further details refence is made to the standard. The average wear of test specimens is expressed in units of mass (i.e. in grams). The less the tyres wear the specimens, the less is the result (grams, g) of the test, and thus the less the tyres wear a regular road, too.

BRIEF DESCRIPTION OF THE DRAWINGS

In the following the invention will be explained in more detail with reference to the appended drawings, in which FIG. 1a shows a stud in a side view, FIG. 1b shows a cross-section Ib of a pin of the stud of FIG. 1a, the cross-section Ib indicated in FIG. 1a, FIG. 1c shows a cross-section Ic of a upper flange of the stud of FIG. 1a, the cross-section Ic indicated in FIG. 1, FIG. 1d shows a cross-section Id of a waist of the stud of FIG. 1a, the cross-section Id indicated in FIG. 1a, FIG. 1e shows a cross-section Ie of a bottom flange of the stud of FIG. 1a, the cross-section Ie indicated in FIG. 1a, FIG. 1f shows the stud in a side view and further measures thereof.

DETAILED DESCRIPTION

Figure 2A:
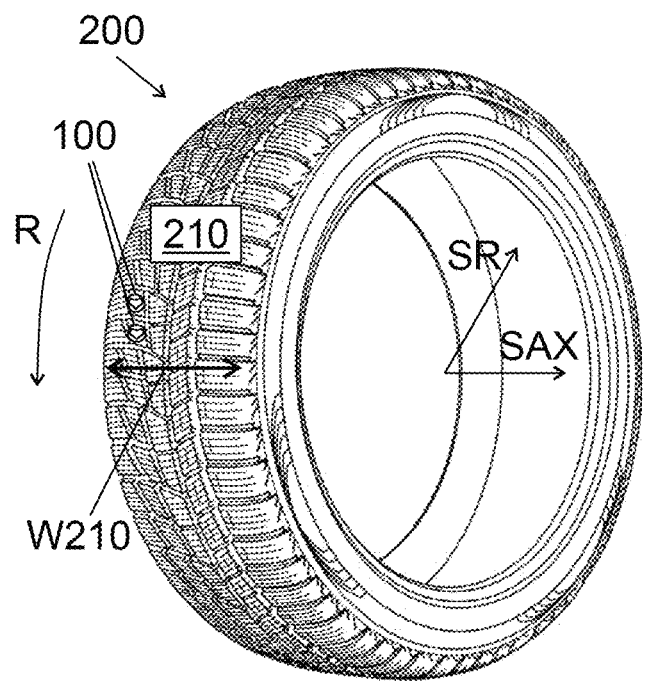
FIG. 2a shows a tyre in a perspective view.
Figure 2B:
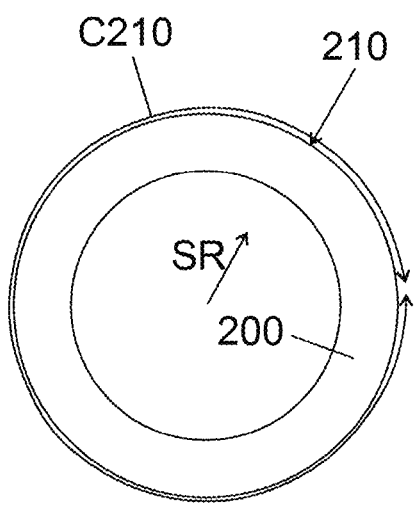
FIG. 2b shows schematically a circumference of a tyre in a side view.
Figure 2C:
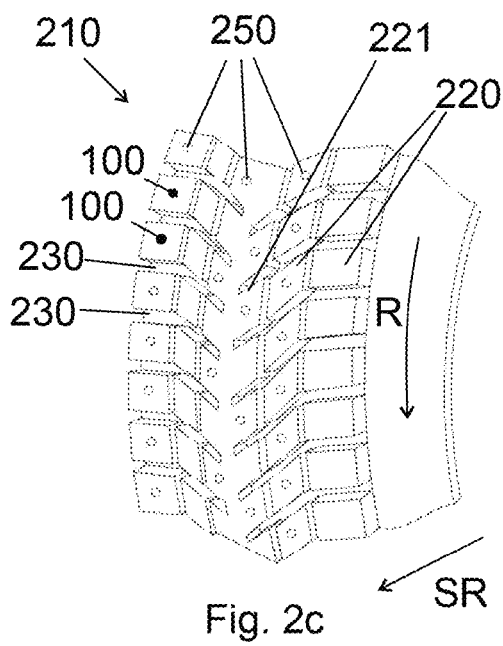
FIG. 2c shows a part of a tyre in a perspective view.

FIG. 2a shows a studded tyre 200. A studded tyre 200 comprises a tread 210 and multiple studs 100 provided in the tread 210. Referring to FIG. 2c, the studs 100 have been installed into stud holes 250. The stud holes 250 may be made to the tread 210 during vulcanization of the tyre. The studded tyre 200 is a tubeless tyre, i.e. functional on a rim and without an inner tyre.

Figure 1G:
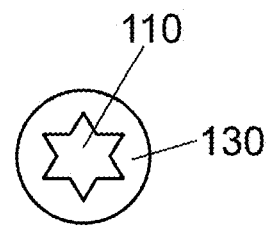
FIG. 1g shows a pin of a stud and an upper flange of a first type in a top view.
Figure 2D:
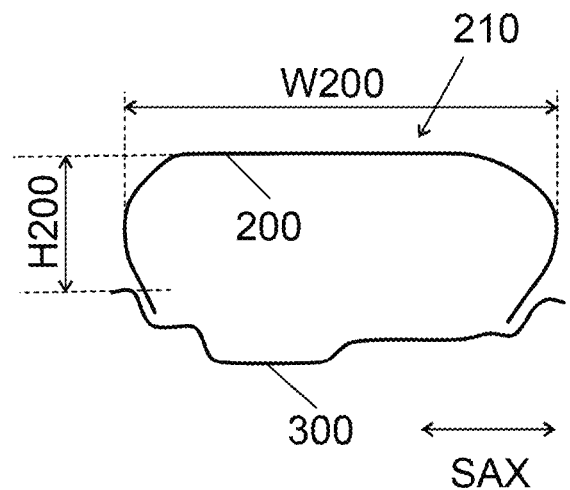
FIG. 2d shows a half of a cross-section of a tyre with some measures.
Figure 2E:
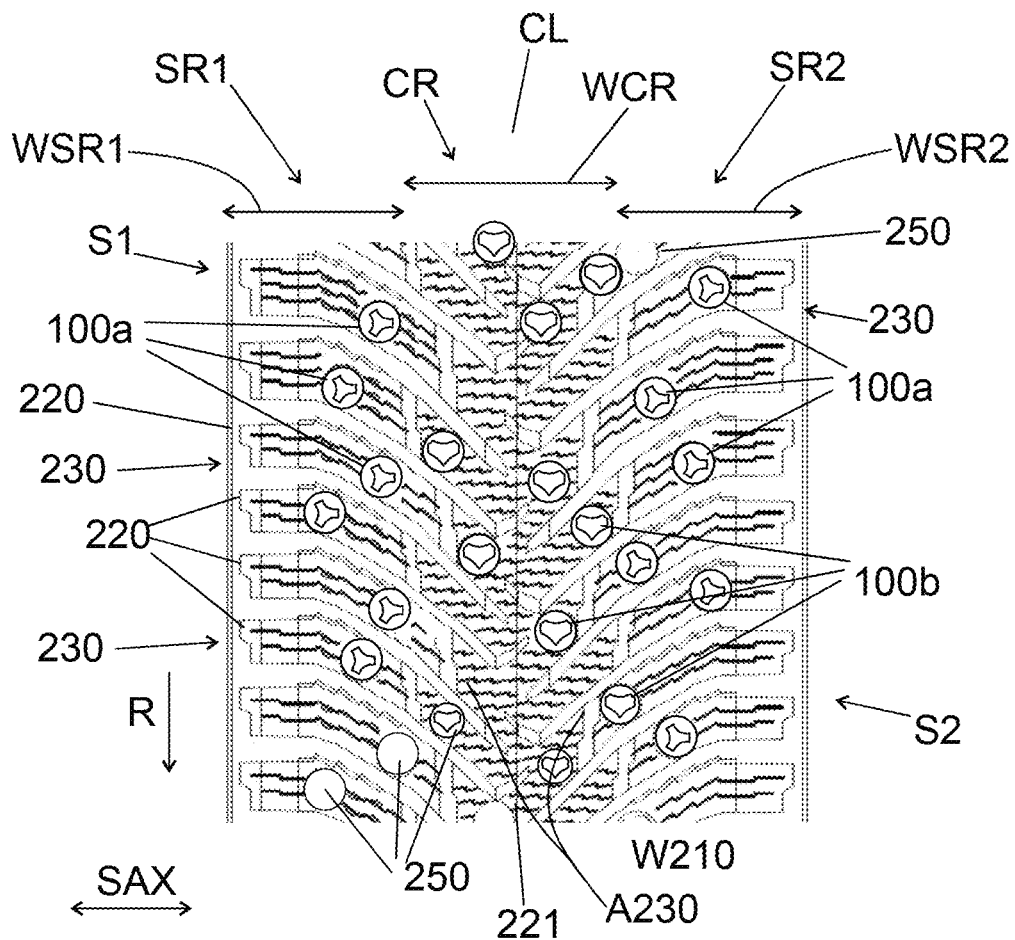
FIG. 2e shows a part of a tread of a tyre.
Figure 5:
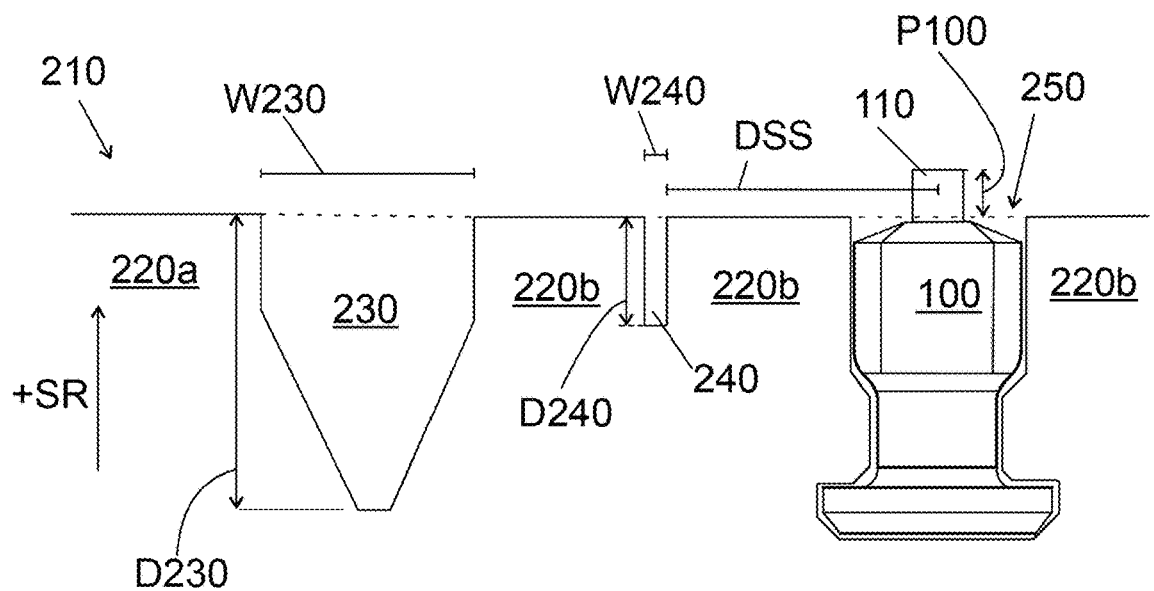
FIG. 5 shows schematically tread blocks, a groove, a sipe and a stud.

Referring to FIGS. 2c and 2e, the tread 210 of the studded tyre 200 comprises tread blocks 220 such that grooves 230 are arranged between the tread blocks 220. In this description, a "rib" is considered as a large tread block 221 in the middle of the tyre 200 which can be regarded as a plurality of mutually connected tread blocks. For example, the tread of FIGS. 2c and 2e include a central tread block 221 that extends over the entire circumference of the tread, even if such a tread block could be called a central rib. A tread 210 needs not comprise a tread block that extends circumferentially throughout the tread 210. In addition, the tyre 200 comprises studs 100, which have been installed into at least some of the tread blocks 220. Referring to FIG. 1a, a stud 100 preferably comprises a pin 110, and preferably each stud 100 of the tyre 200 comprises a pin 100. Moreover, in the tyre 200, at least the pins 110 of the studs 100 are exposed on the tread 210 (see e.g. FIGS. 3a and 5). The pins 110 are exposed so that studs have a protrusion P100 of a stud 100 measured from the tread 210. The protrusion P100 is indicated in FIG. 5. The protrusion P100 is measured in the radial direction +SR and from a planar surface defined by the radially outermost edges of the stud hole 250 into which the stud 100 has been installed. Naturally, the tread 210 itself defines the edges of the stud hole 250.

Some measures of a tyre 200 are depicted in FIG. 2d. Within this description, the width W200 of the tyre 200, as shown in FIG. 2d, refers to the "Section Width" as defined in the Standards Manual 2023 of the European Tyre and Rim Technical Organization (ETRTO). The height H200 of the tyre 200 is also shown in FIG. 2d, and is defined as the "Section Height" in the ETRTO Standards Manual 2023. Correspondingly, the Section Width, i.e. the width W200 of the tyre 200 as defined herein (and in the ETRTO standards manual) is the linear distance between the outsides of the sidewalls of an inflated tyre excluding elevations due to labelling (markings), decoration, or protective bands or ribs. FIG. 2d also shows half of a cross section of a rim 300 onto which the tyre 200 has been installed.

In practice, the tyre width W200 is related to the size marking shown on the tyre 200. In general, the size marking is shown on a tyre as w/hRr, wherein w denotes a width, h an aspect ratio and r a radius. According to the ETRTO standards manual, typical size markings refer to Design Width (i.e. the width W200 of the tyre 200) and an overall diameter as shown in the Table 1 below:

TABLE 1

Tyre width and diameter indicated by a size marking of a tyre

| Size | Section Width (mm) | Overall Diameter (mm) |
|---|---|---|
| 145/55R16 | 150 | 566 |
| 155/55R14 | 162 | 526 |
| 155/55R16 | 162 | 576 |
| 165/55R14 | 170 | 538 |
| 165/55R15 | 170 | 563 |
| 175/55R15 | 182 | 573 |
| 175/55R16 | 182 | 598 |
| 175/55R17 | 182 | 624 |
| 175/55R18 | 182 | 649 |
| 175/55R20 | 182 | 700 |
| 185/55R14 | 195 | 560 |
| 185/55R15 | 195 | 585 |
| 185/55R16 | 195 | 610 |
| 195/55R15 | 201 | 595 |
| 195/55R16 | 201 | 620 |
| 195/55R17 | 201 | 646 |
| 195/55R18 | 201 | 671 |
| 195/55R19 | 201 | 697 |
| 195/55R20 | 201 | 722 |
| 195/55R21 | 201 | 747 |
| 205/55R15 | 214 | 607 |
| 205/55R16 | 214 | 632 |
| 205/55R17 | 214 | 658 |
| 205/55R18 | 214 | 683 |
| 205/55R19 | 214 | 709 |
| 215/55R16 | 226 | 642 |
| 215/55R17 | 226 | 668 |
| 215/55R18 | 226 | 693 |
| 215/55R19 | 226 | 719 |
| 225/55R16 | 233 | 654 |
| 225/55R17 | 233 | 680 |
| 225/55R18 | 233 | 705 |
| 225/55R19 | 233 | 731 |
| 235/55R16 | 245 | 664 |
| 235/55R17 | 245 | 690 |

TABLE 1-continued

Tyre width and diameter indicated by a size marking of a tyre

| Size | Section Width (mm) | Overall Diameter (mm) |
|---|---|---|
| 235/55R18 | 245 | 715 |
| 235/55R19 | 245 | 741 |
| 235/55R20 | 245 | 766 |
| 245/55R16 | 253 | 676 |
| 245/55R17 | 253 | 702 |
| 245/55R18 | 253 | 727 |
| 245/55R19 | 253 | 753 |
| 255/55R16 | 265 | 686 |
| 255/55R17 | 265 | 712 |
| 255/55R18 | 265 | 737 |
| 255/55R19 | 265 | 763 |
| 255/55R20 | 265 | 788 |
| 255/55R21 | 265 | 813 |
| 265/55R18 | 277 | 749 |
| 265/55R19 | 277 | 775 |
| 265/55R20 | 277 | 800 |
| 275/55R15 | 284 | 683 |
| 275/55R16 | 284 | 708 |
| 275/55R17 | 284 | 734 |
| 275/55R18 | 284 | 759 |
| 275/55R19 | 284 | 785 |
| 275/55R20 | 284 | 810 |
| 275/55R21 | 284 | 835 |
| 285/55R18 | 297 | 771 |
| 285/55R19 | 297 | 797 |
| 305/55R20 | 316 | 855 |
| 325/55R22 | 336 | 917 |

It is noted that Table 1 shows only some examples. A tyre may have a different size, in particular another aspect ratio than 55, such as 40, 45, 60 or 65.

FIG. 1a shows an example of a stud 100 which can be used with the studded tyre 200. It should be noted that this is only an example and also other kinds of studs may be used. Moreover, the tyre 200 may comprise more than one kind of studs.

The direction Sz of FIG. 1a is a longitudinal direction of the stud, and the stud may be installed to the tread 210 such that the positive longitudinal direction +Sz is the radially outward direction +SR of the tyre (see e.g. FIG. 5). A purpose of the stud 100 is to improve grip of the tyre 200 particularly on ice.

Referring to FIG. 1a, the stud 100 comprises a body 120 and a pin 110. The body 120 comprises a bottom flange 140 and a second part 130. The second part 130 is joined to the bottom flange 140 and extends in the longitudinal direction Sz of the stud 100 from the bottom flange 140. The pin 110 protrudes from the second part 130 in the longitudinal direction Sz of the stud 100. The pin 110 comprises hard metal or ceramic. In terms of Vickers hardness, the Vickers hardness of the pin 110 is higher than the Vickers hardness of the second part 130.

As shown in FIG. 1e, The bottom flange 140 has a first cross-section on a plane (i) that has a normal in the longitudinal direction Sz of the stud, the first cross-section having a first area A140. Typically, as shown in FIG. 1e, the bottom flange 140 has the first cross-section on a plane that has a normal in the longitudinal direction Sz of the stud. Moreover, the bottom flange 140 has a profile shape extending at least a certain distance in the direction of the normal of the first cross-section. FIG. 1e shows the cross-section Ie of the bottom flange 140 of the stud of FIG. 1a, the cross-section Ie indicated in FIG. 1a. In such a case, the second part 130 extends straight. However, the second part 130 may extend in a curvilinear fashion. FIG. 1d shows the cross-section Id of the bottom flange 140 of the stud of Fig. 1a, the cross-section Id indicated in FIG. 1a. Also in that case, the second part 130 extends straight. However, the second part 130 may extend in a curvilinear fashion.

The pin 110 has a second cross-section on a plane that has a normal in the longitudinal direction Sz of the stud 100, the second cross-section having a second area A110. FIG. 1b shows the cross-section Ib of the pin 110 of the stud of FIG. 1a, the cross-section Ib indicated in FIG. 1a. The first area A140 is greater than the second area A110.

Figure 1H:
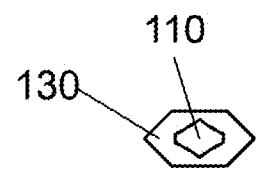
FIG. 1h shows a pin of a stud and an upper flange of a second type in a top view.
Figure 1I:
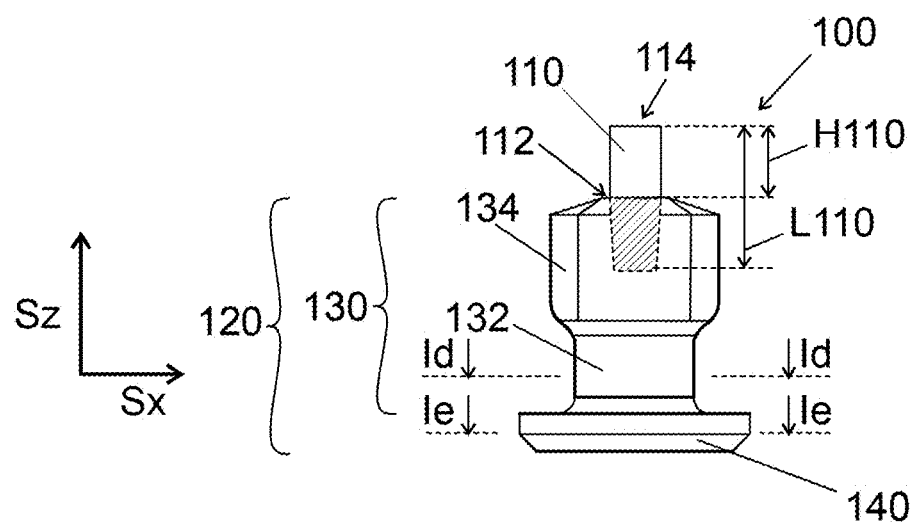
FIG. 1i shows a stud for a centre area of a tyre in a side view.
Figure 1J:
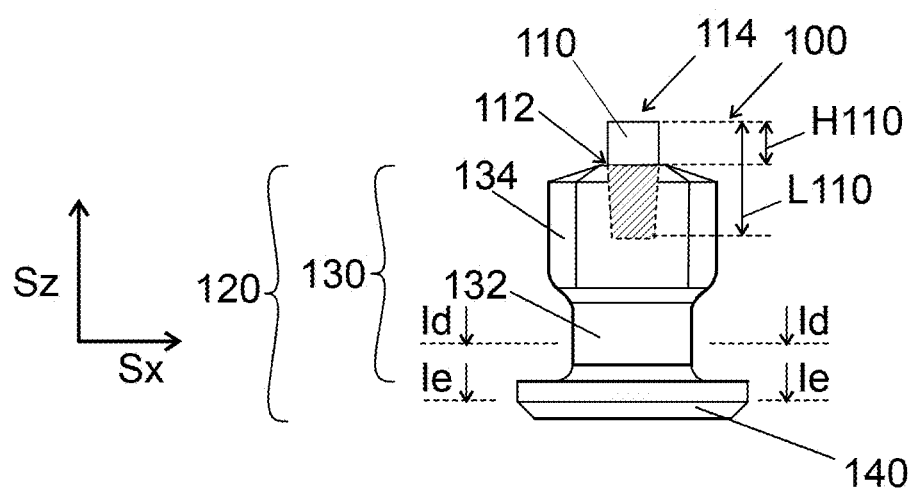
FIG. 1j shows a stud for a shoulder area of a tyre in a side view.

To provide a good grip, the pin 110 should protrude from second part 130 sufficiently. A first height H110 which is the height that the pin 110 protrudes from the second part 130 (e.g. from an upper flange 134 of the second part 130) is depicted in FIGS. 1f, 1i and 1j. As shown in FIGS. 1f, 1i and 1j, the second part 130 extends in the longitudinal direction Sz of the stud 100 from the bottom flange 140 to an interfacial point 112 between the second part 130 and the pin 110 and does not extend further in this direction. In FIG. 1a, a waist 132 and the upper flange 134 constitute the second part 130.

The pin 110 and the second part 130 define the first height H110, which is the length the pin 110 protrudes from the interfacial point 112 in the longitudinal direction Sz to the extremal point 114 of the pin 110 in the longitudinal direction Sz of the stud. Thus, the pin 110 protrudes the first height H110 from the second part 130 of the stud; particularly from the interfacial point 112.

For good grip, the first height H110 should be sufficient. However, if the first height H110 is excessive, the road wear caused by the stud may increase. Moreover, not only the tip 110 affects grip and road wear. Particularly, a size of the bottom flange 140 affects grip and road wear, too. A large bottom flange 140 oftentimes implies that the stud 100 is arranged in the stud hole 250 in a stiff manner, i.e. the bottom flange 140 resists movement of the studs in the negative radial direction −SR when the stud is pressed in this direction. A reason is that the large bottom flange 140 supports the stud 100 to the rubber material of the tyre beneath the bottom flange in a sturdy manner. This typically results in a high piercing force of the stud on the road; and a high piercing force implies high road wear. This applies also vice versa. A small bottom flange will, in general, reduce the piercing force and in this way the road wear.

The piercing force herein refers to the piercing force as defined in the regulation "Ajoneuvon nastarenkaiden tekniset vaatimukset ja tyyppihyväksyntä" TRAFICOM/220809/03.04.03.00/2019 of the Ministry of Transport and Communications on studs of tyres for vehicles (dated Oct. 2, 2021). This Ministry is the Ministry of Transport and Communications of Finland.

It has been found that a good compromise between the piercing force and the road wear is achieved when a ratio A140/H110 of the first area A140 to the first height H110 is 20 to 50 mm$^2$/mm. An even more preferable value for this ratio A140/H110 is 25 to 48 mm$^2$/mm, most preferably 28 to 45 mm$^2$/mm.

In accordance with an embodiment, the shape of all the studs is substantially similar to each other, but some of the measures of the studs are different so that height H110 of the pin 114 is longer in at least most of the studs 100 in the centre area CR than most of the studs 100 in the shoulder areas SR1, SR2. FIG. 1i illustrates as a side view an example of a stud 100 for the centre area CR and FIG. 1j illustrates as a side view an example of a stud 100 for the shoulder areas SR1, SR2. It can be seen that the height H110 of the pin 114 of the stud 100 of FIG. 1*i* is longer than the height H110 of the pin 114 of the stud 100 of FIG. 1*j*.

Figure 8A:
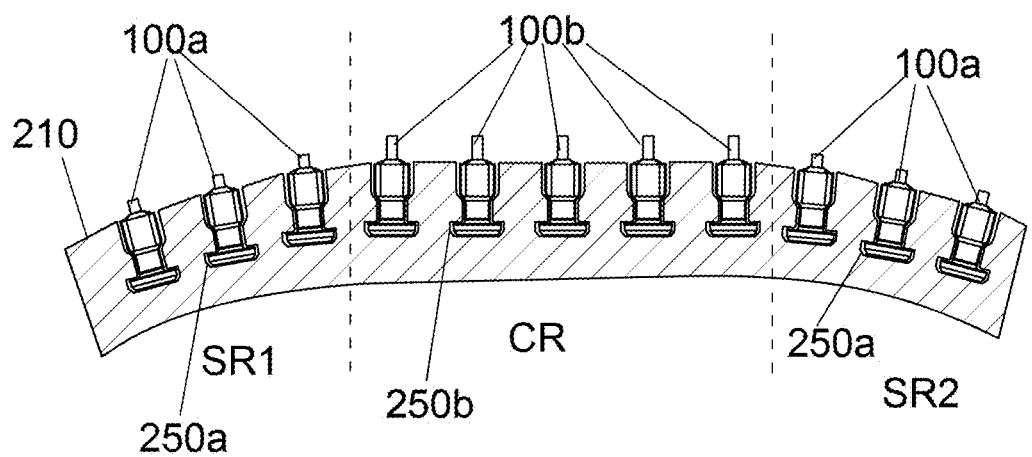
FIG. 8a shows a cross section of a part of a tyre according to an embodiment.

FIG. 8*a* shows a cross section of a part of a tyre 200 according to an embodiment in which the studs 100*b* of FIG. 1*i* have been used in the centre area CR and the studs 100*a* of FIG. 1*j* have been used in the shoulder areas SR1, SR2. It can be seen that the depth of stud holes 250*b* in the centre area CR and in the shoulder areas SR1, SR2 is substantially equal.

Figure 8B:
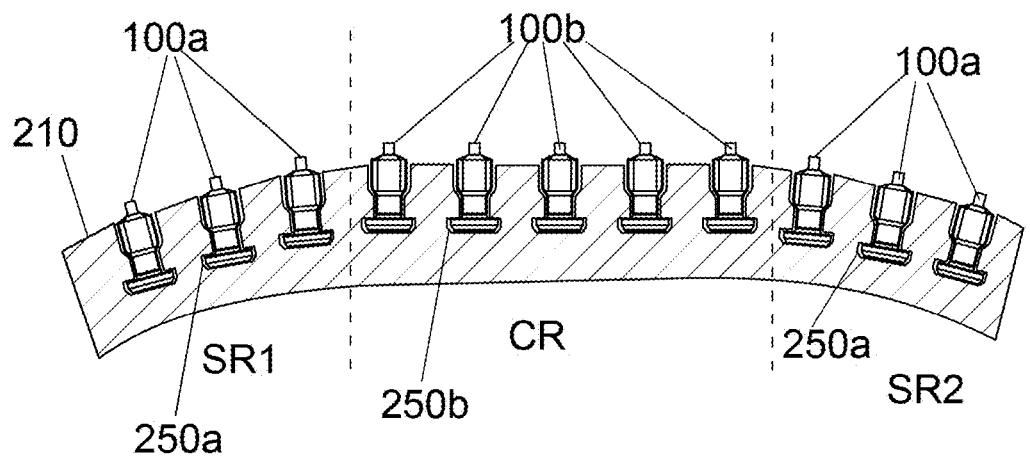
FIG. 8b shows a cross section of a part of a tyre according to another embodiment.

In accordance with an embodiment, the higher protrusion is achieved by using similar stud lengths in both centre area and shoulder areas but using stud holes having different depths in the centre area than in the shoulder areas. This is illustrated in FIG. 8*b*, which shows a cross section of a part of the tyre 2++ according to this embodiment. It can be seen that the depth of the stud holes 250*b* in the centre area CR is smaller than the depth of the stud holes 250*a* in the shoulder areas SR1, SR2.

It should be noted that the cross sections of FIGS. 8*a* and 8*b* are only showing principles of these two embodiments but the scales and all the details of these figures may not correspond to practical implementations. For example, the tread 210 is not showing different layers which tyres 200 typically have.

In accordance with yet another embodiment, the higher protrusion is achieved by using in the centre area CR studs which have longer total length H100 than studs in the shoulder area SR1, SR2, but the pin 110 of each stud may have substantially equal length H110. Hence, the length H120 (FIG. 1*f*) of the body 120 of the stud 100 is longer in the studs of the centre area than in the studs of the shoulder area SR1, SR2.

Studs 100 in the centre area CR tend to wear faster than studs 100 in the shoulder areas SR1, SR2. Therefore, having the higher protrusion in the studs 10 of the centre area CR may prolong the good grip of the tyre 200. Furthermore, the studs in the shoulder areas SR1, SR2 tend to rise upwards during usage of the tyre 200, wherein the grip in the shoulder areas SR1, SR2 may also tend to last longer. Overall, these two factors may make it possible to use the studder tyres 200 according to the invention longer than without utilization of the present inventive idea.

The low value of road wear may be achieved e.g. by having a sufficiently low dynamic impact to the road, particularly when driving at the speed indicated in the road wear standard. Features affecting the dynamic impact of the studs to the road include:
  Mass of the stud,
  Protrusion P100 of the stud,
  Area of the bottom flange 140 (A140),
  Size and shape of the stud pin 110, and
  The rubber material supporting the bottom flange 140, the material optionally being comprised by an underlayer 293.

Both the first area A140 and the rubber material supporting the bottom flange 140 have effect on how sturdy the stud is supported to the rubber material of the tire.

As for the material of the tyre 200, also the rubber material of the tread 210 may affect road wear induced by the studs 100 of the tyre 200. Thus, in an embodiment, the tread 210 comprises rubber material having a Shore hardness in the range 48 to 59 Sh(A) as measured with durometer type A, at the temperature 23° C. In an embodiment, the tread 210, in particular the part of the tyre that is configured to contact a road in use, is formed of rubber material having a Shore hardness in the range 48 to 59 Sh(A) as measured with durometer type A, at the temperature 23° C.

Figure 3A:
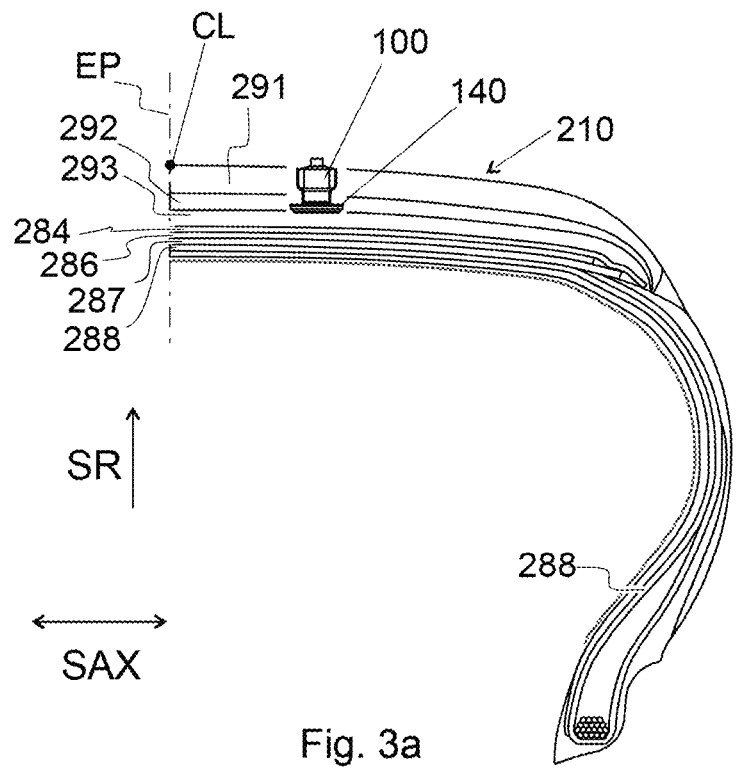
FIG. 3a shows a quarter of a cross-section of a tyre.
Figure 3B:
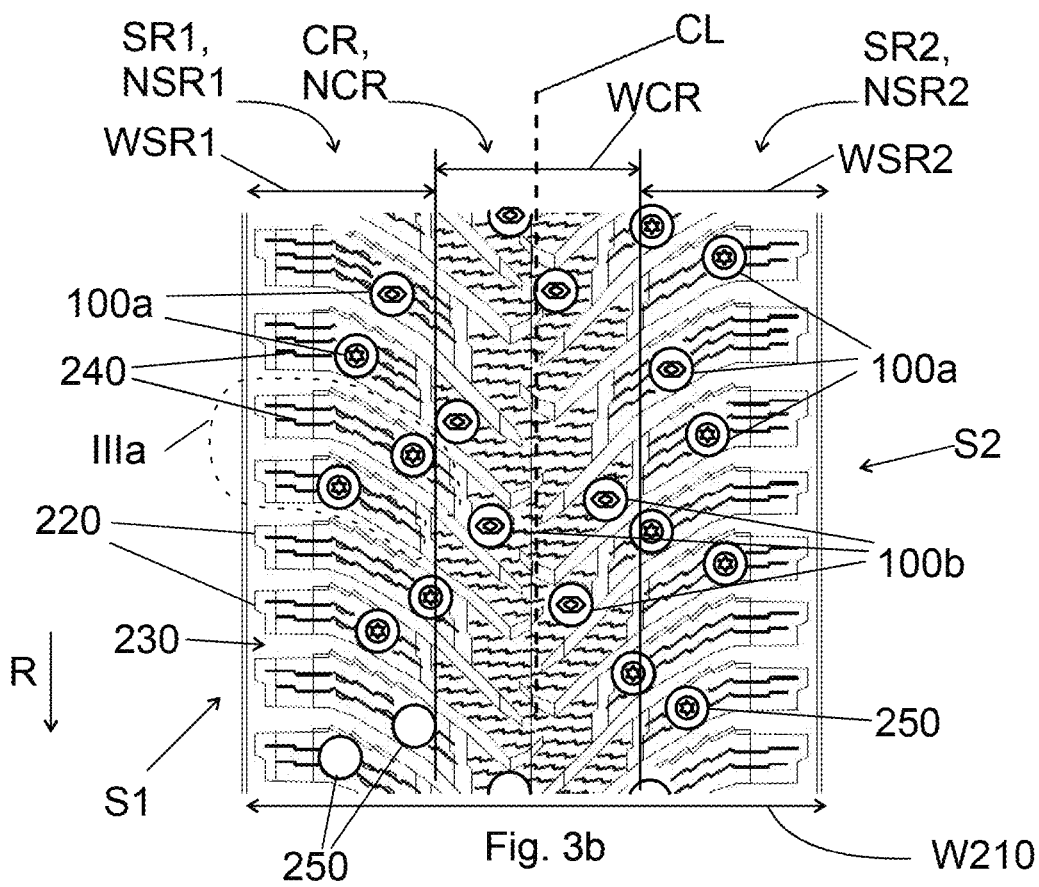
FIG. 3b shows a part of a tread provided with sipes, grooves, and studs.
Figure 3C:
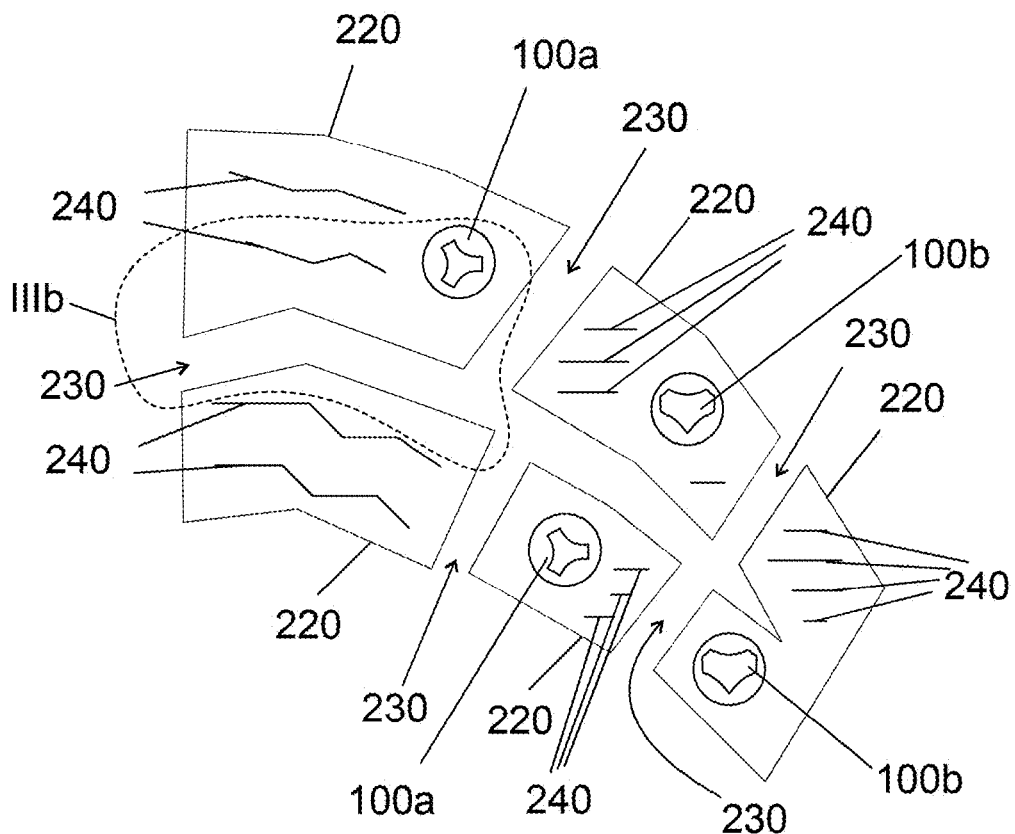
FIG. 3c shows the detail IIIa of FIG. 3b.
Figure 3D:
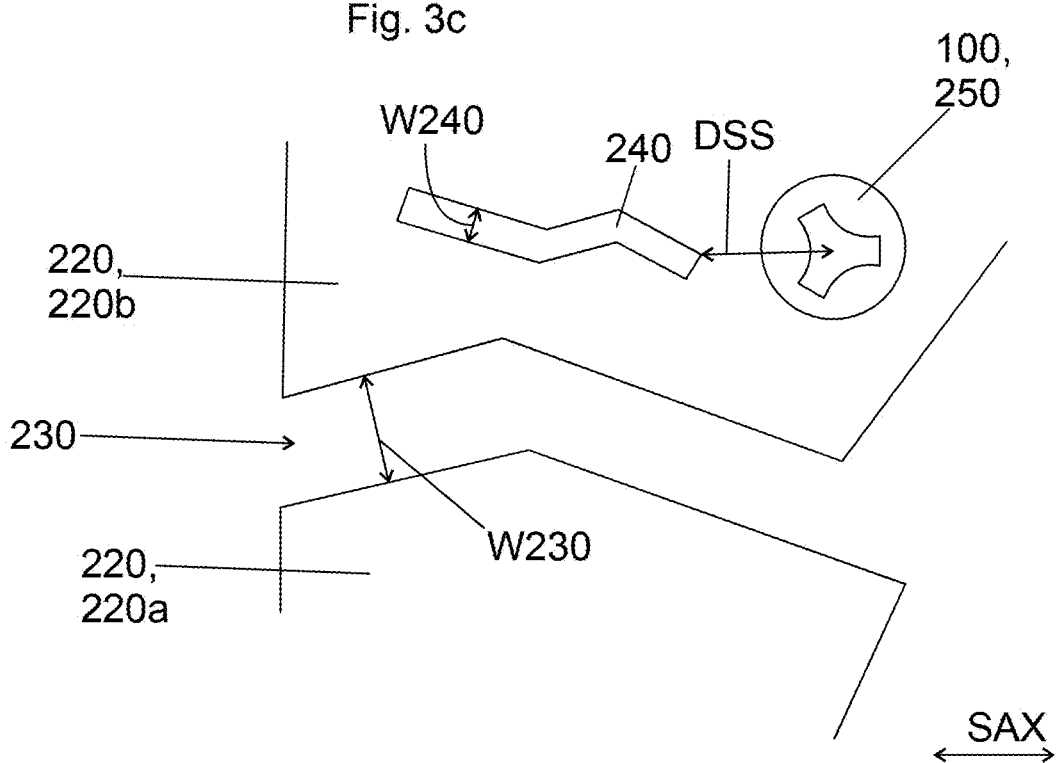
FIG. 3d shows the detail IIIb of FIG. 3c.

The stiffness of the tread blocks 220 can also be softened by providing sipes 240 to the tread 210. Thus, in an embodiment, at least some of the tread blocks 220 are provided with sipes 240. As is well known, sipes 240 are narrow openings in tread blocks 220. Sipes 240 are shown in FIGS. 3*b* and 3*c*. Concerning the narrowness of the sipes, in an embodiment, a width W240 of all the sipes 240 is less than 2.0 mm. The width W240 of a sipe is shown in FIG. 3*d*. In an embodiment, a depth D240 (FIG. 5) of all the sipes 240 is at least 2.0 mm. A bottom a sipe needs not be even. In such a case the depth of the sipe 240 refers to a depth of the deepest point of the sipe 240.

The tread blocks 220 of the tread 210 also limit grooves 230. Thus, the tread 210 comprises tread blocks 220 such that grooves 230 are arranged between the tread blocks 220. As an example, FIG. 3*d* shows a groove 230 arranged between a first tread block 220*a* and a second tread block 220*b*. In an embodiment, a width W230 of at least one of the grooves 230, as measured on the level of the tread 210 limiting the groove 230, is more than 4.0 mm. The width W230 is shown in FIG. 3*d*. The grooves may taper radially inward (i.e. in the −SR direction). Thus, in an embodiment, a width W230 of at least one of the grooves 230 decreases in an inward radial direction −SR of the tyre. Reference is made to FIG. 5. In an embodiment, a depth D230 of at least one of the grooves 230 is more than 7.0 mm, preferably 8 mm to 15 mm. A depth of a sipe 240 is less than a depth of a groove 230. More specifically, in an embodiment, a depth D240 of all the sipes 240 is less than a depth D230 of one of the grooves 230.

When the tyre 200 comprises sipes, preferably, no sipe 240 is provided close to a stud hole 250, in which a stud 100 has been installed. Referring to FIG. 3*d*, a stud 100 has been installed in a stud hole 250, and no part of any of the sipes 240 is arranged closer than the distance DSS to a centre of the stud hole 250. The distance DSS may be in a range from 6 mm to 12 mm, for example. Preferably, no part of any of the sipes 240 is arranged closer than 8 mm or closer than 10 mm to a centre of the stud hole 250. In addition or alternatively, multiple studs have been installed in multiple stud holes and no part of any of the sipes 240 is arranged closer than 6 mm, 8 mm, 10 mm, 11 mm or 12 mm to a centre of any one of the stud holes 250. In addition or alternatively, multiple studs have been installed in multiple stud holes and no part of any of the sipes 240 is arranged closer than 6 to 10 mm to a centre of any one of the stud holes 250. FIG. 3*d* shows the distance DSS that is arranged between a sipe 240 and a centre of a stud hole 250. This has the effect that stud 100 is reliably fixed to its stud hole 250. Otherwise the sipe 240 would soften the tread also near the stud hole 250 and in this way increase the risk of the stud 100 falling from the stud hole 250. Thus, this also improves the grip of the tyre 200.

In an embodiment, at least some of the grooves 230 are inclined such that they define a V-shape or a half of a V-shape, the V-shape or the half thereof defining a direction of rotation R of the tyre 200 when used driving forwards, the direction of rotation R being reverse to the direction to which the V-shape or the half thereof opens. As an example, the grooves of FIG. 2*c* define a half of a V-shape. In contrast the grooves of FIG. 3*d* define a full V-shape. Such a tread is what is commonly known as "unidirectional" i.e. the tyre is designed to be fitted to the vehicle wheel in one particular way. This improves the grip of the tyre by improving the efficiency of draining water and/or slush from underneath the tyre 200 in regular use of the tyre. This arrangement of grooves also does not increase the road wear Such a unidirectional tyre may comprise a marking on a sidewall of the tyre, the marking being indicative of the direction of rotation for the tyre.

Such a tyre can be manufactured by vulcanizing a green tyre to form the tyre 200 and forming stud holes to the tread 210 of the tyre 200 during the vulcanizing the green tyre. After vulcanization, the studs 100 are installed to the stud holes 250 of the tread 210. FIG. 3b shows two stud holes 250 to which a stud has not been installed. As shown therein, typically the stud holes 250, before the studs 100 have been inserted into the holes 250, are small compared to the studs 100. However, because the tread blocks 220 are elastic, the stud holes 250 are stretched when installing the studs 100 to the holes 250. This further improves fixing of the studs 100 to the stud holes 250.

When the tyre comprises sipes 240, in an embodiment, the sipes are formed to the tread 210 of the tyre 200 during the vulcanizing the green tyre by using lamella blades.

As detailed above both (i) the area of the cross section of the pin 110 and (ii) a stiffness of the support of the bottom flange 140 affect the dynamic impact. Thus, as an example, the tyre according to the invention may comprise a stud 100 comprising the bottom flange 140, the second part 130, and the pin 110 such that the greatest diameter of the bottom flange 140 is in the range from 7.5 mm to 10.5 mm and the smallest diameter of the bottom flange 140 is in the range from 5.0 mm to 9.5 mm.

The cross-section of the bottom flange 140 is preferably greater than a cross-section of the second part 130. Thus, the bottom flange 140 anchors the stud 100 well to the stud hole 250. Therefore, in an embodiment, the second part 130 has a third cross-section on a plane that has a normal in the longitudinal direction Sz of the stud 100, the third cross-section having a third area (A130, A132, A134), and the first area A140 is greater than the third area (A130, A132, A134). The third area A130 may correspond to a (sole) third area of the second part; or the third area A130 may correspond to an area A132 of a cross-section of a waist 132 or an area A134 of a cross-section of a upper flange 134.

As detailed above, the protrusion P100 of a stud 100 affects the dynamic impact. Preferably, the protrusion P100 is between 0.6 mm and 2.0 mm, more preferably between 0.7 mm and 1.6 mm, and most preferably between 0.8 mm and 1.4 mm measured from an inflated unused tyre. The protrusion of stud P100 is shown in FIG. 5. In an embodiment, these values apply to an average of the protrusions P100 of the studs 100 (i.e. all the studs 100) of the tyre. In an embodiment, these values apply to all the protrusions P100 of the studs 100 (i.e. all the studs 100) of the tyre individually. However, it should be noted that, due to the inventive idea presented in this specification, the average of protrusions is bigger in the centre area CR than in the shoulder areas SR1, SR2.

In an embodiment the tyre 200 comprises multiple studs 100 comprising only pins 110 having one type of cross section. Thus, in an embodiment, the pin 110 of all the studs of the tyre 200 are identical in shape.

In another embodiment the tyre 200 comprises more than one type of stud pins 110. In other words, some studs have pins of one type of cross section and some other studs have pins of another type of cross section. There may also be a third, fourth etc. types of cross sections of the pins 110 at different locations of the studs 100 of the tyre 200.

In yet another embodiment the tyre 200 comprises more than one type of studs 100. In other words, some studs have one type of cross section at different locations and some other studs have another type of cross section at those locations. There may also be a third, fourth etc. types of cross sections at different locations of the studs 100 of the tyre 200.

To this end, in an embodiment the tyre 200 comprises multiple studs 100a of a first stud type and multiple studs 100b of a second stud type. FIG. 3b shows a tread 210 to which multiple studs 100a of a first stud type and multiple studs 100b of a second stud type have been installed. For example, the shape of the studs 100a of the first type are shown in FIG. 1g, and the shape of the studs 100b of the second type are shown in FIG. 1h. Also FIG. 2e shows a tread 210 to which multiple studs 100a of a first stud type and multiple studs 100b of a second stud type have been installed.

In FIG. 2e, a central region CR of the tread comprises studs 100b of the second stud type, and both a first shoulder region SR1 and a second shoulder region SR2 comprise studs 100a of the first stud type. Studs 100b of the second type are not identical with the studs 100a of the first stud type. Thus, in an embodiment, a central region CR of the tread 210 is arranged between a first shoulder region SR1 of the tread 210 and a second shoulder region SR2 of the tread 210. The central region CR comprises a circumferential central line CL of the tread 210. In an embodiment, the circumferential central line CL of the tread 210 divides also the central region to two equally wide parts. The first shoulder region SR1 extends in an axial direction SAX from a first side S1 of the tread 210 towards the circumferential central line CL. The first side S1 is shown in FIG. 2e. The second shoulder region SR2 extends in an axial direction SAX from a second side S2 of the tread 210 towards the circumferential central line CL. The second side S2 is also shown in FIG. 2e. In an embodiment, the first shoulder region SR1, the second shoulder region SR2 and the central region CR constitute the tread 210. In other words, in the embodiment, the tread 210 consists of the first shoulder region SR1, the second shoulder region SR2 and the central region CR.

In accordance with an embodiment, the central region CR has a width which is in a range from 33% to 49% of the total width W210 of the tread 210, but may be different from that. Some examples to be mentioned are the range from 35% to 40%, or 44% to 48%

Figure 4A:
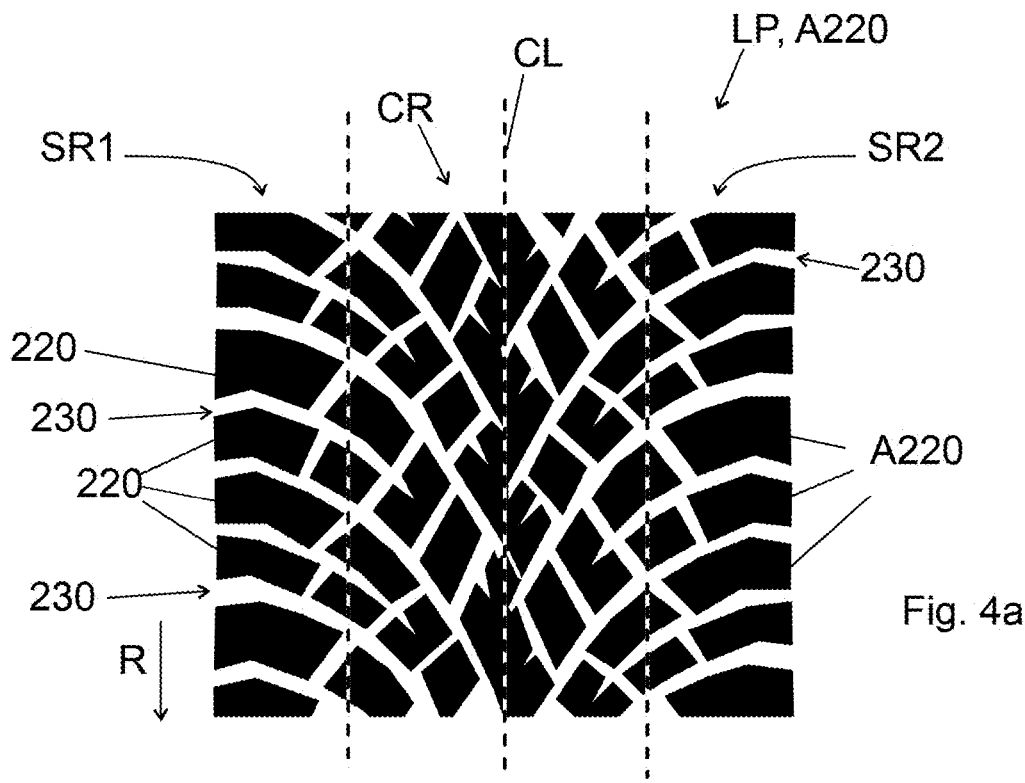
FIG. 4a illustrates a land portion of a tyre.

The tread blocks 220 of the tyre 200 define a land portion LP of the tread 210. A part of the land portion LP of the tread is shown by black colour in FIG. 4a. Naturally, the land portion extends around the whole circumference of the tread 210. The land portion of the tread 210 consists of the parts of the tread blocks 220 that are arranged to contact a surface (e.g. the road) in use of the tyre 200. The land portion has a total land area A220 (as measured e.g. in units of dm$^2$). Some of the tread blocks 220 of the tyre 200 have been provided with studs, and also the cross-sections of the studs 100 belong to the land portion LP.

An area of the tread 210 which is simultaneously contacting a surface may be called as a footprint. The area of the footprint may slightly vary due to certain conditions. For example, the load affected to each tyre and the pressure within the tyres may affect the area of the footprint. The more load the larger may be the area of the footprint. On the other hand, the higher the pressure the smaller the footprint may be.

Figure 4B:
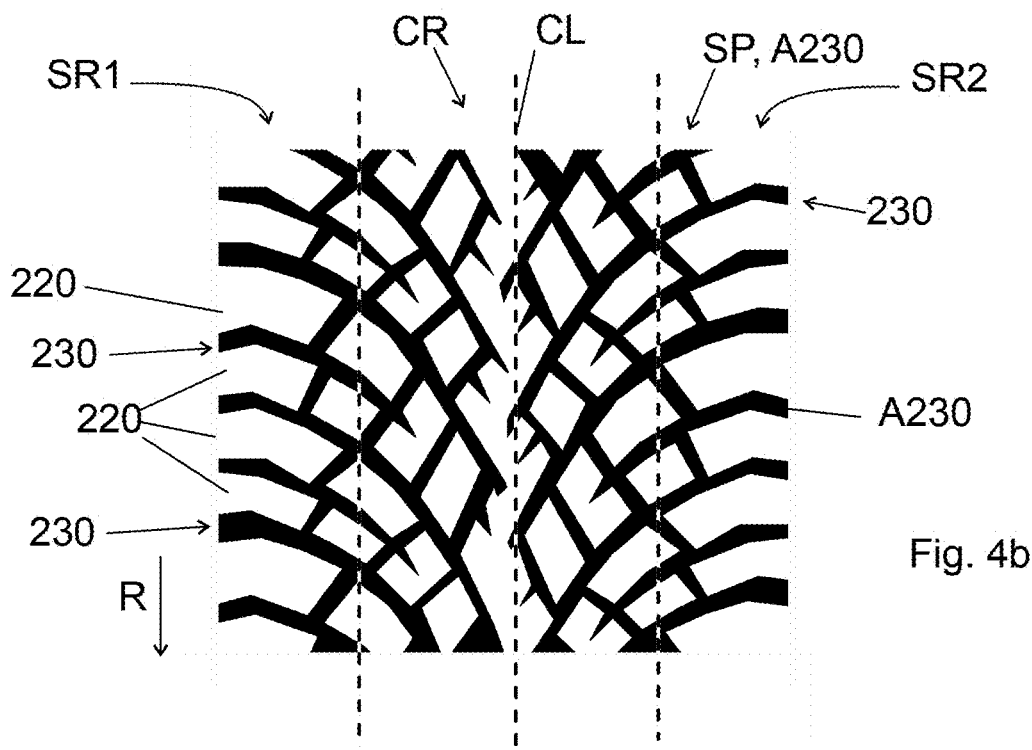
FIG. 4b illustrates a sea portion of a tyre.

The tread blocks 220 of the tyre 200 define an envelope surface. The envelope surface consists of the land portion LP of the tread 210 and the regions defined by the openings of the grooves 230. The openings of the grooves 230 may be commonly referred to as a sea portion SP of the envelope surface, as shown in black colour in FIG. 4b. Also the sea portion SP extends around the whole circumference of the tread 210. The sea portion SP of the envelope surface has a sea area A230. The land portion LP (FIG. 4a) and the sea portion SP (FIG. 4b) together form the envelope surface. Thus, the tread blocks 220 are delimited outward in the radial direction +SR by the envelope surface; and the land portion of the envelope surface forms the ground contact surface of the tread 210. The envelope surface has a total envelope area A210, as measured e.g. in units of $dm^2$.

Thus, the total envelope area A210 is the sum of the land area A220 and the sea area A230, i.e. A210=A220+A230. Referring to FIGS. 2a and 2b, a width of the tread 210 is depicted by W210 and a circumference by C210. The total envelope area A210 is thus approximately equal to the product W210×C210. However, because the tread 210 is also curved in the axial direction SAX on the tyre 200, this is only an approximation. As for the circumference C210, the circumference C210 may equal pi (i.e. 3.14) times the overall diameter indicated in Table 1.

In this description, an average land ratio refers to the ratio of the total land area A220 to the total envelope area A210. In other words, by the land ratio is meant the ratio of the ground contacting surface area of tread blocks to the imaginary ground contacting area of the tread, the imaginary ground contacting area of the tread including spaces (i.e. grooves) between adjacent blocks and the blocks themselves. In other words, by the land ratio is meant the ratio of the ground contacting surface area of tread blocks to a ground contacting area of an imaginary tread, the imaginary tread having been formed from the tread by filling the grooves with tread material.

In the art, one sometimes uses the term sea area ratio to mean the ratio of the sea area to the imaginary ground contacting area of the tread. In line with these definitions the sum of the land ratio and the sea area ratio equals one.

In the art, the term "land-to-sea ratio" may, occasionally, be used interchangeably with the land ratio as defined above. However, the term land-to-sea ratio or land/sea ratio may relate to a ratio of the land area (ground contacting area) to the sea area (non-contacting area) of the tread. To avoid possible confusion, the term land area is used throughout this description and in the meaning defined above.

According to an embodiment, the land ratio of the tread is greater in a central area than in a shoulder area. FIGS. 3a and 3b therefore show a circumferential central line CL of the tread 210. The circumferential central line CL divides the tread 210 to two equally wide parts. The circumferential central line CL is an intersection of the tread 210 and its equatorial plane EP. As shown in FIG. 3b, a central region CR of the tread 210 is arranged between a first shoulder region SR1 of the tread 210 and a second shoulder region SR2 of the tread 210. The central region CR comprises the circumferential central line CL of the tread 210. In an embodiment, the circumferential central line CL of the tread 210 divides also the central region to two equally wide parts. Limits between these regions are shown by dash lines in FIGS. 3a and 3b. The circumferential central line CL is also shown by a dash line. In an embodiment, the first shoulder region SR1, the second shoulder region SR2 and the central region CR constitute the tread 210. In other words, in the embodiment, the tread 210 consists of the first shoulder region SR1, the second shoulder region SR2 and the central region CR.

In an embodiment, at least two thirds of the studs 100 that are arranged in the central region CR are of the second stud type (they are studs 100b), and at least two third of the studs arranged in the first and second shoulder regions SR1, SR2 are of the first stud type (they are studs 100a).

In an embodiment, the studs 100a of the first stud type comprise substantially identical first pins. A cross-section of a first pin, the plane of the cross-section having a normal to the longitudinal direction Sz of the stud, has a first shape. Moreover, the studs 100b of the second stud type comprise substantially identical second pins. A cross-section of a second pin, the plane of the cross-section having a normal to the longitudinal direction Sz of the stud, has a second shape. The second shape is different from the first shape. For example, the pin 110 of the stud 100a of the first type is shown in FIG. 1g, and the pin 110 of the stud 100b of the second type, is shown in FIG. 1h.

In an embodiment, not only the stud pins 110 of the first stud type are different from the stud pins of the second type, but also at least some parts of the body 130 of the studs 100a of the first stud type are different from corresponding parts of the body 130 of the studs 100b of the second stud type.

By using at least two different types of studs, the grip of the tyre can be optimized. This is particularly true, when studs of the second type are used in the central region CR, and studs of the first type are used in the shoulder regions SR1, SR2.

The grip of the tyre can be improved by using sufficiently many studs. The grip of the tyre can be improved by using sufficiently many studs on both sides of the circumferential central line CL.

Concerning the former, in an embodiment, the tread 210 has the first width W210 and the first circumference C210, as defined above. Moreover, the tread 210 is provided with a total number N100 of studs 100. A ratio (N100/(W210× CL)) of the total number of the studs N100 to the width of the tread W210 and the circumference C210 of the tread can be equal to or more than 5.6 pieces per square-decimetre (pcs/dm2). In an embodiment, the ratio (N100/(W210× C210)) of the total number N100 of the studs to the product W210×C210 of the first width W210 and the first circumference C210 is more than 6.8 pieces per square-decimetre ($pcs/dm^2$). In another embodiment, a ratio (N100/(W210× C210)) of the total number N100 of the studs to the product W210×C210 of the first width W210 and the first circumference C210 is more than 7.2 pieces per square-decimetre ($pcs/dm^2$). The first circumference C210 may be measured along the circumferential central line CL, e.g. along a circumferential central line of the envelope surface of the tread 210.

Thus, in an embodiment, N100/(W210×C210CL)≥5.6 $pcs/dm^2$, wherein N100 is a total number of studs in the tire, W210 is the width of the tread (dm), and C210 is the circumference of the tyre 200 in dm, measured along the circumferential central line CL.

In the other embodiment mentioned above, N100/(W210× C210CL)>6.8 $pcs/dm^2$.

In the third embodiment mentioned above, N100/(W210× C210CL)>7.2 $pcs/dm^2$.

Figure 7:
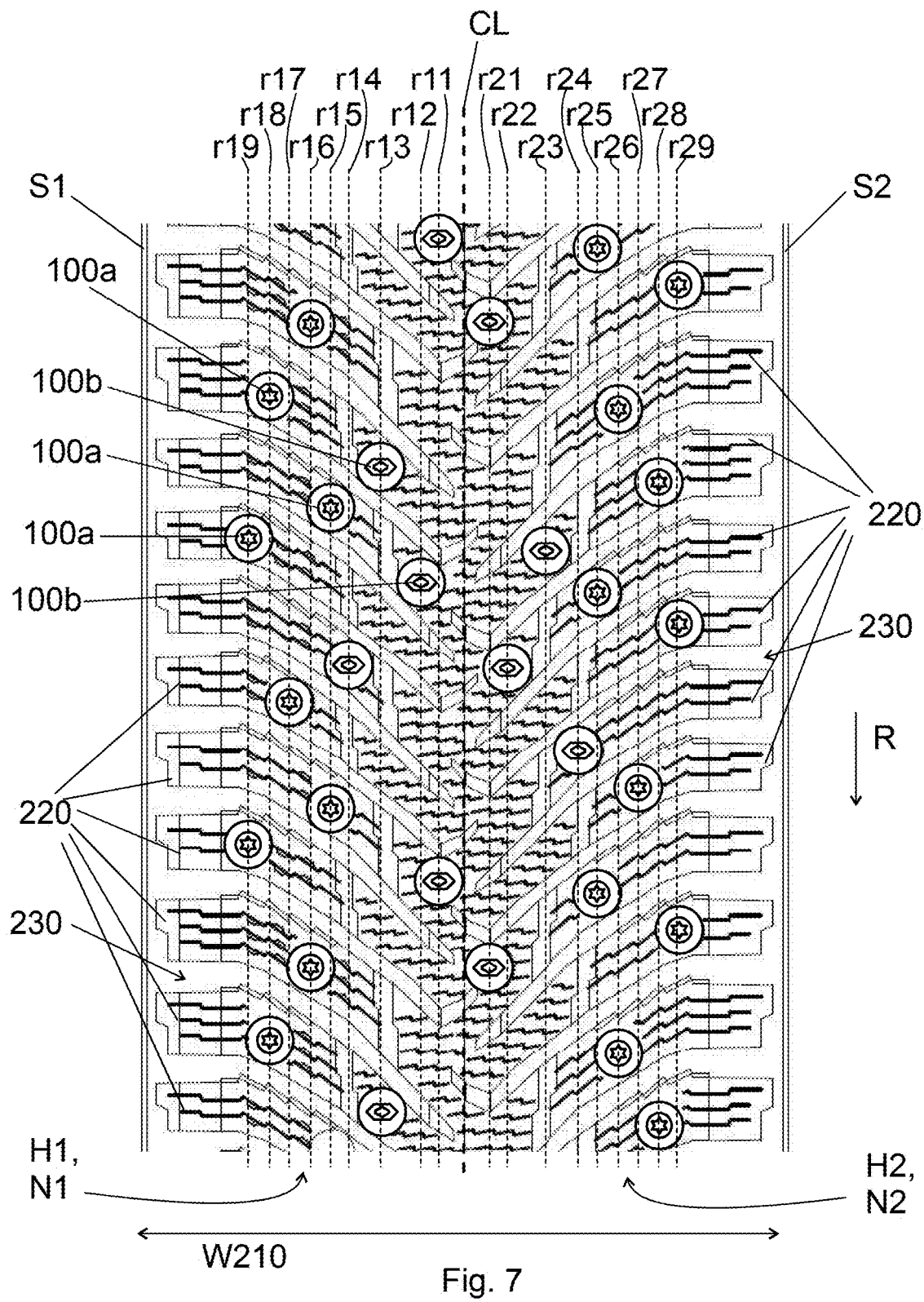
FIG. 7 shows a part of a tread of a tyre.

Concerning the latter (the number of studs on each half of the tread), in an embodiment, the circumferential central line CL of the tread 210 (as well as the equatorial plane EP) defines a first half of the tread 210 and a second half of the tread 210 (see FIG. 7). In the embodiment, the first half comprises a first number N1 of studs 100, 100a, 100b and the second half comprises a second number N2 of studs 100, 100a, 100b such that a ratio (N1/N2) of the first number to the second number is 90% to 110%.

The width W210 of the tread 210 may be somewhat smaller than a width W200 of the tyre. Within this description, the width W200 of the tyre 200, as shown in FIG. 2d, refers to the "Section Width" as defined in the ETRTO standards manual 2023. The height H200 of the tyre 200 is also shown in FIG. 2d, and is defined as the "Section Height" in the ETRTO standards manual 2023. Correspondingly, the Section Width, i.e. the width W200 of the tyre 200 as defined herein (and in the ETRTO standards manual) is the linear distance between the outsides of the sidewalls of an inflated tyre excluding elevations doe to labelling (markings), decoration, or protective bands or ribs. FIG. 2d also shows half of a cross section of a rim 300 onto which the tyre 200 has been installed. As for the circumference C210, the circumference C210 may equal pi (i.e. 3.14) times the overall diameter indicated in Table 1 (see above).

The first width W210 (i.e. that of the tread) may be equal to the reference tread width as defined in the ETRTO standards manual 2023 (see Design Guide, Page PC.7). In accordance with the definitions therein, the reference tread width C is calculatable as $$C = (1.075 - 0.005ar)s^{1.001}$$

Herein s is the Section Width (defined above), i.e. the width W200 of the tyre, and ar is the nominal aspect ratio, which is readable from the size marking w/hRr (see above), the "h" indicating the aspect ratio. Thus, the first width W210 of the tread 210 may equal the value C as calculatable with the equation given above, wherein s equals W200.

The following Table 2 shows some examples of measures of tyres. The size indicates the diameter and width of the tyre, the aspect ratio indicates the height of the tyre as a percentage of the width of the tyre, ETRTO design width is the width of the tyre according to ETRTO, the reference tread width is the actual width of the tread.

TABLE 2

Some measures of typical tyres

| Size | Aspect Ratio (AR) | ETRTO design width | Reference tread width (RTW) |
| --- | --- | --- | --- |
| 275/35R20 | 35 | 278 | 251.6 |
| 255/40R19 | 40 | 260 | 228.8 |
| 235/45R18 | 45 | 236 | 201.7 |
| 225/50R17 | 50 | 233 | 193.3 |
| 205/55R16 | 55 | 214 | 172.1 |
| 185/60R15 | 60 | 189 | 147.2 |
| 175/65R14 | 65 | 177 | 133.4 |

Referring to FIG. 7, each stud is arranged at a distance from the circumferential central line CL. Thus, each stud defines a circumferential row rij, the circumferential row being parallel to the circumferential central line CL and at such a distance that the stud is arranged on the circumferential row rij. Herein "rij" stands for j:th circumferential row in the i:th half. FIG. 4c shows nine rows (j=1, 2, . . . , 9) on both halves (i=1 or 2). Several studs may be arranged on the same circumferential row. However, preferably not all the studs of first half of the tread are arranged on the same circumferential row. This applies also for the studs of the second half of the tread. Preferably, studs are arranged on at least six different circumferential rows.

Referring to FIG. 7, in an embodiment, each one of the multiple studs 100, 100a, 100b of the tyre 200 is arranged on a circumferential row (r11, r12, r13, r14, r15, r16, r17, r18, r19, r21, r22, r23, r24, r25, 26, r27, r28, r29) such that the studs 100, 100a, 100b are arranged on at least six different circumferential rows. Different circumferential rows (r11, r12, r13, r14, r15, r16, r17, r18, r19, r21, r22, r23, r24, r25, r26, r27, r28, r29) are arranged a distance apart from each other, and multiple studs may be arranged on only one circumferential row (r11, r12, r13, r14, r15, r16, r17, r18, r19, r21, r22, r23, r24, 25, r26, r27, r28, r29).

Preferably, the circumferential central line CL of the tread 210 defines the first half of the tread 210 and the second half of the tread 210, and the studs are arranged such that at least three different circumferential rows (r11, r12, r13, r14, r15, r16, r17, r18, r19) of the at least six different circumferential rows (r11, r12, r13, r14, r15, r16, r17, r18, r19, r21, r22, r23, r24, 25, r26, r27, r28, r29) are arranged on the first half, and at least three different circumferential rows (r21, r22, r23, r24, r25, r26, r27, 28, r29) of the at least six different circumferential rows (r11, r12, r13, r14, r15, r16, r17, r18, r19, r21, r22, r23, r24, r25, r26, r27, r28, r29) are arranged on the second half.

Having such many rows rij effective spreads the studs to the tread 210 reasonably evenly, thereby improving the grip.

In addition to the tread 210 of the tyre 200, the structure of the tyre 200 provides for sufficient stiffness of the tyre 200 and thereby also affect the grip and road wear properties of the tyre 200. The tread 210 is provided as an outermost layer of a carcass of the studded tyre 200. A quarter of a cross-section of a tyre 200 is shown in FIG. 3a. The relevant cross-section for FIG. 5e is such a cross-section that is a cross-section of the tyre 200 with a plane that comprises the axis of rotation of the tyre, which is parallel to the axial direction SAX (see FIG. 2e) and located in the centre defined by the tyre 200. Such cross-section has two parts, which are substantially identical. One of such parts is shown in FIG. 3a. A half of only one of the parts is shown in FIG. 3a. An equatorial plane EP (shown in FIG. 3a) of the tyre 200 divides the tyre to two equally large parts. The circumferential central line CL. defined above is arranged in the equatorial plane EP.

As detailed above, the tyre comprises the tread blocks 220 that define the grooves 230 and the tread 210, which is an outermost layer of the carcass. Preferably, the carcass of the studded tyre 200 comprises one or more layers of reinforcing textile or textiles and one of more reinforcing metal layers.

In general, a tyre 200 has side surfaces on opposite sides of the tread 210. The side surfaces connect the bead area of the tyre to the tread 210. The side surfaces may have various markings indicating the tire size, tire speed class, tire purpose (winter/summer), tire manufacturer and/or tire name. The bead area of a tyre has a cable. The function of the cable and the bead area is to fit the tire 200 to the rim.

The tyre 200, in particular the carcass thereof, comprises a first ply 288. The ply/plies 288 may comprise fibrous material, e.g. Kevlar, polyamide, carbon fibres, polyester or glass fibres. In an embodiment, the tire further comprises a second ply. In this embodiment, the second ply may also comprise fibrous material.

The carcass further comprises a first metal belt 287. Preferably, the carcass further comprises a textile belt 284, such as a textile belt 284 comprising fibrous polyamide (e.g. Nylon, aramid, or Cordura). Preferably, the carcass further comprises the second ply and a second metal belt 286. The metal belt(s) 287, 286 is/are resilient metal belts, such as steel belts comprising wires.

The tread blocks 220 are formed in a cap layer 291 of the tyre 200. The cap layer 291 may further comprise material connecting the tread blocks 220 to the cap layer 291 and layers beneath the cap layer 291. Under the tread blocks 220 of the tread 210, i.e. under the cap layer 291, the tyre preferably comprises an underlayer 293 made of suitable rubber material. A purpose of the underlayer 293 is to adaptively affect the impact of the studs to the road according to temperature. Thus, at higher temperatures (e.g. above 0° C.) the impact of the studs may be lower than at lower temperatures, e.g. below 0° C. Hence, road wear due to the studs 100 of the tyre 200 may be lower when roads are not covered by show and/or ice. Thus, in an embodiment, the bottom flange 140 of at least a part of the studs 100 of the tyre 200 are arranged partly in the underlayer 293.

The underlayer 293 may have a hardness which may vary substantially with the ambient temperature, wherein the wear of the road surface may be reduced. The underlayer 293 is preferably arranged at least partly below the anti-skid stud. Thus, the bottom of the anti-skid stud can be in contact with the underlayer 293, and the anti-skid stud can be pressed against and/or retract into the underlayer 293.

The anti-skid stud 100, preferably the bottom flange 140 of the anti-skid stud, can be in direct contact with the underlayer 293. Thus, in this embodiment, there is no other material layer between the anti-skid stud 100 and the underlayer 293. Alternatively, for example, a separate stud pad 199 may be arranged between the anti-skid stud 100 and the underlayer 293.

Further, the studded tyre 200 may comprise a separate bottom rubber ply (also called as an undertread) arranged below the underlayer 293. Thus, the properties of the studded tyre 200 can be improved. Moreover, the process of manufacture of the tyre 200 can be easier to control. In an example, the studded tyre 200 is not provided with a bottom rubber ply below the underlayer 293. Thus, the manufacturing costs of the tyre 200 can be reduced.

Figure 6A:
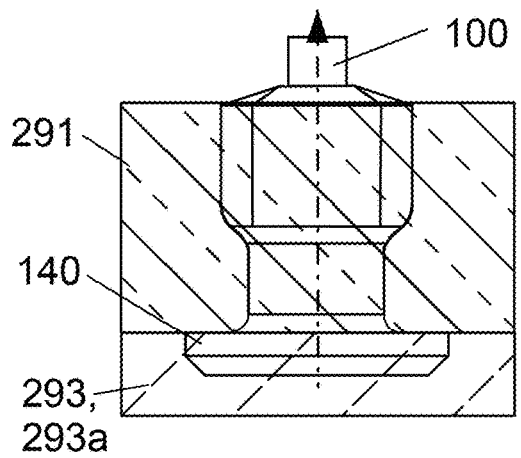
FIG. 6a shows schematically a stud arranged on an underlayer and penetrating through a cap.
Figure 6B:
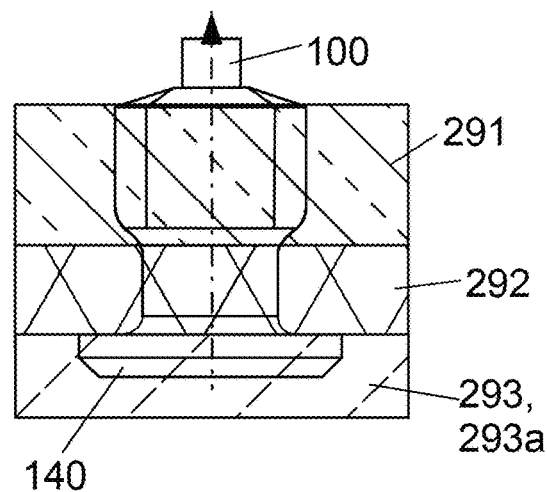
FIG. 6b shows schematically a stud arranged on an underlayer and penetrating through an intermediate layer and a cap layer.
Figure 6C:
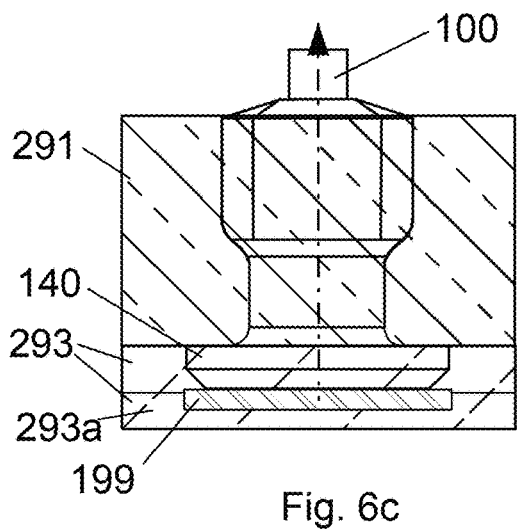
FIG. 6c shows schematically a stud arranged on an underlayer and a stud pad.
Figure 6D:
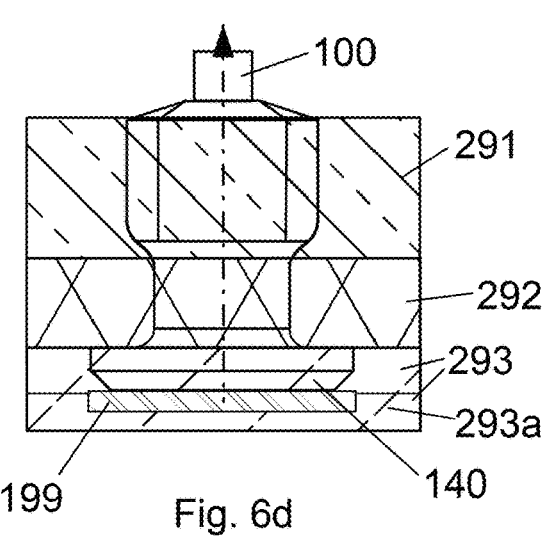
FIG. 6d shows schematically a stud arranged on an underlayer and a stud pad.

As depicted in FIGS. 6a to 6d, preferably the studs 100 are arranged to contact the underlayer 293 directly or via stud pads 199. The stud holes 250 may e.g. penetrate into the underlayer 293 through the tread cap layer 291 and, optionally, through an intermediate layer 292. As an example, in FIG. 6a, a stud hole (and the stud 100) penetrates into the underlayer 293 through the tread cap layer 291. As an example, in FIG. 6b, a stud hole (and the stud 100) penetrates into the underlayer 293 through the tread cap layer 291 and an intermediate layer 292. As indicated in FIGS. 6c and 6d, a stud pad 199 may be arranged in between the underlayer 199 and the bottom flange 140 of the stud 100. The bottom flange 140 of at least a part of the studs 100 of the tyre 200 are arranged at least partly on the underlayer 293.

Figure 6E:
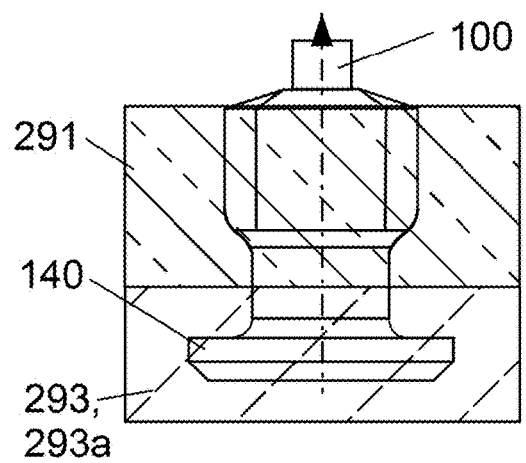
FIG. 6e shows schematically a stud arranged in an underlayer without a stud pad.
Figure 6F:
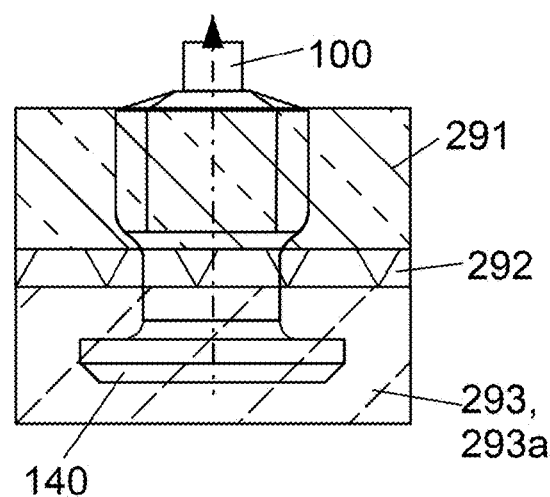
FIG. 6f shows schematically a stud arranged in an underlayer without a stud pad.

FIG. 6e illustrates an example in which the bottom flange 140 and a part of the waist 132 are embedded in the underlayer 293 in a tyre which does not have the intermediate layer 292. FIG. 6f illustrates an example in which the bottom flange 140 and a part of the waist 132 are embedded in the underlayer 293 in a tyre which has the intermediate layer 292 above the underlayer 293. In this example the intermediate layer 292 and also a part of the underlayer 293 surrounds the waist 132 but the intermediate layer 292 can also be higher at the height of the upper flange 291, for example.

FIG. 6a shows a detailed view of the cap layer (as indicated by the tread block 220) and a underlayer 293. As detailed therein, the bottom flange 140 is in contact with the underlayer 293. Therefore, the material of the underlayer 293, in connection with the first area A140 define a degree of support the carcass of the tyre 200 imposes on the stud 100. Support is needed particularly at low temperatures so that the protrusion of studs 100 from the surface of the treads 220 will not become too low when the studs are in contact with the road surface. At temperatures when no ice or snow should not exist on the road surface the adaptive underlayer becomes softer wherein the protrusion of studs 100 from the surface of the treads 220 may become lower and thus may wear road surface less than if the underlayer 293 were not adaptive. A reasonably soft material of the cap layer and the treads provides for good grip on ice and snow.

For these reasons, in an embodiment, at an ambient temperature of −30° C. a Shore (A) hardness of the underlayer 293 is not less than a Shore (A) hardness of the material of the tread blocks 220. The mechanical properties of the underlayer 293 need not depend on temperature; whereby this difference in the Shore hardnesses may apply also at higher temperatures.

However, preferably, the material of the underlayer 293, which supports the bottom flange 140, is selected such that it softens at higher temperatures. In other words, the hardness of the material of the underlayer 293 under each stud 100 decreases when temperature of the material increases (i.e. the hardness has a negative temperature coefficient). This has the effect that even if the studs are highly supported at low temperatures (because of the shore hardness, see above), at higher temperatures the studs do not wear the road as much, because of the reduced support provided by the softer underlayer 293.

Therefore, in an embodiment, the underlayer 293 comprises adaptive material. The adaptive material is adaptive to the temperature in the sense that it hardens at low temperatures and softens at high temperatures. Thus, the underlayer according to this specification can also be called as an adaptive underlayer. The underlayer may consist primarily or entirely of the adaptive material layer. The adaptive material layer comprises a material having a hardness substantially depending on ambient temperature.

The adaptive material layer can be made of a material compound having a hardness substantially depending on ambient temperature. Preferably, the underlayer is made of an elastomer material having a hardness depending on the temperature of the elastomer material.

The materials for the underlayer and the intermediate layer can be selected so that a dynamic stiffness of the underlayer differs from a dynamic stiffness of the intermediate layer at most temperatures.

The dynamic stiffness of the underlayer, determined at a temperature of 20° C., can be configured to be less than 25 MPa, preferably from 5 to 20 MPa. Further, the dynamic stiffness of the intermediate layer, determined at a temperature of 20° C., can be configured to be at least 25 MPa, preferably at least 27 MPa, and more preferably from 30 to 100 MPa. Technical effect is to decrease road wear while the intermediate layer supports the whole tire and the studs of the tire at the warmer temperature.

The dynamic stiffness of the underlayer, determined at a temperature of 0° C., can be configured to be at least two times the dynamic stiffness of the underlayer at a temperature of 20° C. Further, the dynamic stiffness of the intermediate layer, determined at a temperature of 0° C., can be configured to be from 1 to 1.5 times, preferably from 1.1 to 1.4 times, the dynamic stiffness of the intermediate layer at a temperature of 20° C. Technical effect is that the winter grip properties of the winter tire can be substantially improved while the intermediate layer supports the whole tire and the studs of the tire at warmer temperatures.

The dynamic stiffness of the underlayer can be at least 100% higher, preferably at least 150% higher than the dynamic stiffness of the intermediate layer at a temperature of 0° C.

Technical effect is that the ice grip properties of the winter tire can be substantially improved at 0° C. The dynamic stiffness of the underlayer may further be equal to or less than 1000% higher, such as equal to or less than 900% higher, preferably equal to or less than 580% higher than the dynamic stiffness of the intermediate layer at a temperature of 0° C.

Furthermore, the dynamic stiffness of the intermediate layer can be higher than the dynamic stiffness of the underlayer at a temperature of at least 5° C., such as at a temperature of at least 7° C. In a particularly advantageous embodiments, the dynamic stiffness of the intermediate layer is higher than the dynamic stiffness of the underlayer at temperatures from 10° C. to 20° C. Technical effect is to reduce road wear while improving handling properties of the tire. Further technical effect is that the intermediate layer effectively supports the stud.

The dynamic stiffness of the underlayer at −25° C. can be at least 20 times the dynamic stiffness of the underlayer at +20° C. Thus, the grip properties of the winter tire can be substantially improved, and, for example, the braking distance needed by the winter tire under certain conditions can be substantially reduced.

The dynamic stiffness E* of the underlayer 293 can be
lower than 25 MPa at an ambient temperature of +20° C.,
between 25 and 500 MPa, preferably from 40 to 400 MPa, at an ambient temperature of 0° C., and
at least 500 MPa at an ambient temperature of −30° C.

The change in the dynamic stiffness of the underlayer upon a decrease in the temperature can have a greater impact on the grip of the tire in winter than the change in the hardness of the material upon a decrease in the temperature. For the above-mentioned dynamic stiffness values, the adjustment of the stud's dynamic impact of the tire at different temperatures can be more controllable, and the grip properties of the winter tire can be better optimized for different temperatures. Thanks to the above-mentioned dynamic stiffness, for example the braking distance on an icy road can be substantially reduced.

In a preferred example, for optimizing the grip properties of the tire in winter,
(A) the hardness (ShA) of the underlayer can be
lower than 60 ShA and preferably lower than 55 ShA at 20° C.,
preferably at least 60 ShA, more preferably at least 65 ShA, at 0° C., and
higher than 75 ShA at −30° C.;
and furthermore,
(B) the dynamic stiffness of the underlayer can be
lower than 25 MPa at an ambient temperature of 20° C.,
between 25 and 500 MPa at an ambient temperature of 0° C., and
at least 500 MPa at an ambient temperature of −30° C.

In general, the higher the dynamic stiffness E*, the harder the material. These values have been found suitable for providing sufficient grip at low temperatures, yet low road wear at high temperatures. In this specification, the term dynamic stiffness E* refers to the stiffness of the material as determined according to the standard ASTM D5992-96 (reapproved 2018).

The temperature dependence of dynamic stiffness E* can be affected by selecting the tan delta peak temperature of the material in a suitable manner. The underlayer 293 can comprise, primarily comprise, or consist of a material whose tan delta peak temperature can be at least −20° C., for example at least −15° C., preferably at least −12° C., more preferably at least −10° C., or at least −8° C., and most preferably at least −5° C. Furthermore, the tan delta peak temperature of said material may not be higher than 20° C., for example not higher than 15° C., preferably not higher than 12° C., more preferably not higher than 10° C., or not higher than 8° C., and most preferably not higher than 5° C. Thus, the hardening of the underlayer can be suitable in view of road wear and winter grip. The closer to 0° C. the tan delta peak temperature of the material is arranged, the more accurately the hardening of the underlayer can take place at a point optimal in view of road wear and winter grip, and the easier the impact of the stud can be to control at different temperatures.

Therefore, in an embodiment, the underlayer 293 is made of a material having a tan delta peak temperature that is between −20° C. and +12° C., and more preferably between −5° C. and +5° C.

The term "tan delta" refers to tan δ and the term "tan delta peak" refers to the temperature associated to the turning point of tan delta curve and tan delta maximum value.

The dynamic stiffness E* also affects the hardness of the material. In an embodiment, a Shore A hardness of the underlayer 293 can be configured to be in a range between 45 ShA and 65 ShA at an ambient temperature of +22° C., more preferably at least 65 ShA, at 0° C., and at least 75 ShA at an ambient temperature of −30° C. More preferably, a Shore A hardness of the underlayer 293 is between 45 ShA and 60 ShA, most preferably in a range between 45 ShA and 55 ShA at an ambient temperature of +22° C., and higher than 75 ShA at an ambient temperature of −30° C.

Furthermore, the dynamic stiffness of the underlayer can be lower than 20 MPa at an ambient temperature of 20° C., between 40 and 400 MPa at an ambient temperature of 0° C., and at least 500 MPa at an ambient temperature of −30° C.

In this specification, the term Dynamic stiffness (E*) refers to the stiffness of the material which can be determined according to the standard ASTM D5992-96 (reapproved 2018).

The mechanical properties as well as their temperature dependence can be adapted by material selections.

The underlayer can comprise one or more polymer materials having a hardness depending on the temperature of the respective polymer material. The underlayer can comprise elastomer material.

In addition to the material of the underlayer 293 as such, also the thickness thereof affects the support of the stud 100.

Advantageously, the thermally adaptive underlayer has a thickness in a direction Sz substantially perpendicular to the direction of rotation of the tyre, wherein the thickness d1 is in the range of 0.5 mm to 8 mm, preferably in the range of 1 mm to 7.5 mm, most preferably in the range of 1.5 mm to 7 mm. Thus, the properties of the underlayer can be easier to control so that the underlayer can yield to a particularly suitable extent when the ambient temperature rises, which can further reduce wear of the road surface. In this application, the thickness of the underlayer refers to the thickness of the underlayer when the anti-skid stud is in a rest position, that is, when the anti-skid stud is not subjected to external forces, such as pressure caused by the driving surface.

Referring to FIG. 3a, the material layer that is adjacent to the underlayer 293 and radially inward from underlayer may be the layer 284, i.e. a textile belt. This thickness applies particularly to the thickness of the adaptive material.

Other features of the stud 100 that are particularly related to the amount of road wear include the following, each one separately or in combination:

Preferably, a total length of the stud 100 is more than 9.5 mm, advantageously in the range from 10.0 mm to 11.0 mm.

In accordance with an embodiment, the density of the studs 100 in the tread 210 is more than or equal to 5.6 studs/dm$^2$, preferably more than 6.8 studs/dm$^2$, and more preferably more than 7.2 studs/dm$^2$.

In accordance with an embodiment, the studs are arranged in three or more rows in the direction of rotation at both sides of the centre line CL. In other words, there are at least six rows of studs.

In accordance with an embodiment, the number of studs 100 on each side of the tyre 200 is the same or a difference of the number of studs 100 on each side of the tyre 200 is not higher than 10%.

In accordance with an embodiment, there is a lamella-free area around each stud 100 so that the radius of the lamella-free area is more than 6 mm, preferably about 8 mm. In accordance with an embodiment, the radius is about 10 mm.

In accordance with an embodiment, the studs 100 of the tyre 200 have one, two or three axes of symmetry.

In addition to the above mentioned properties related to the studs, properties of the tyre 200 may also affect the noise generated by the tyre 200 during driving. In the following, some examples are provided, wherein any of these properties or any combination of these properties may be implemented in a studded tyre 200 according to the invention.

In accordance with an embodiment, there is a base layer beneath the studs 100. The base layer may also be called as an underlayer 293.

In accordance with an embodiment, there is a layer of material under each stud 100 which is softer than the intermediate layer at least when the temperature of the tyre is higher than 10° C.

In accordance with an embodiment, there is an intermediate layer 292 around each stud 100.

In accordance with an embodiment, there is a stud pad 199 under each stud 100.

In accordance with an embodiment, the tyre 200 comprises one kind of studs 100.

In accordance with an embodiment, the tyre 200 comprises at least two different kinds of studs 100.

In accordance with an embodiment, the tread blocks 220 are arranged to groups of over 50 pitch on both sides of the tread 210.

In accordance with an embodiment, stud holes 250 have been formed to the tread during vulcanization of the tyre 200.

In accordance with an embodiment, the tread 210 of the tyre 200 comprises a mixture of two or more layers.

In accordance with an embodiment, the properties of the tyre 200 are such that a result of a road wear as measured according to SFS7503:2022:en is less than 1.0 g for a tyre of the size 215/60R16 having load capacity of 775 kg (99), speed class 190 km/h (T) and extra load (XL).

In accordance with an embodiment, the properties of the tyre 200 are such that a result of a road wear test as measured according to SFS7503:2022:en is less than 1.00 g and the load index (LI) of the tyre (200) is 99 or more.

In accordance with an embodiment, the properties of the tyre 200 are such that a result of the road wear of the tyre 200 as measured according to the standard SFS7503:2022:en is less than 0.91 g and the load index (LI) of the tyre (200) is 93 or more.

In accordance with an embodiment, the properties of the tyre 200 are such that a result of the road wear of the tyre (200) as measured according to the standard SFS7503:2022:en is less than 1.09 g and the load index (LI) of the tyre (200) is 105 or more.

The invention claimed is:

1. A tyre comprising:
   a tread having tread blocks;
   a plurality of stud holes; and
   a plurality of studs installed in at least some of the stud holes;
   wherein:
   studs in a centre area of the tyre have a higher protrusion from a surface of the tread than studs in a shoulder area of the tyre;
   a protrusion of a majority of the studs in the centre area of the tyre is in a range from 1.0 to 1.3 mm and a protrusion of a majority of the studs in the shoulder area of the tyre is in a range from 0.8 to 1.0 mm, and the protrusion of the studs in the centre area is at least 0.1 mm higher than the protrusion of the studs in the shoulder area; or
   an average protrusion of the studs in the centre area of the tyre is in a range from 1.0 to 1.3 mm and an average protrusion of the studs in the shoulder area of the tyre is in a range from 0.8 to 1.0 mm, and the protrusion of the studs in the centre area is at least 0.1 mm higher than the protrusion of the studs in the shoulder area; or
   the protrusion of the studs in the centre area of the tyre is in a range from 1.1 to 1.2 mm and the protrusion of the studs in the shoulder area of the tyre is in a range from 0.9 to 1.0 mm; or
   the protrusion of the studs in the centre area of the tyre is in a range from 0.9 to 1.1 mm and the protrusion of the studs in the shoulder area of the tyre is in a range from 0.8 to 1.0 mm, and the protrusion of the studs in the centre area is at least 0.1 mm higher than the protrusion of the studs in the shoulder area.

2. The tyre according to claim 1 comprising grooves arranged between the tread blocks, wherein a depth of the grooves is greater than 7.0 mm.

3. The tyre according to claim 1, wherein the tyre comprises at least two different kinds of studs.

4. The tyre according to claim 1, wherein a total length of each one of the studs is more than 9.5 mm.

5. The tyre according to claim 1, wherein the studs comprise a bottom flange such that a greatest diameter of the bottom flange is in a range from 7.5 mm to 10.5 mm and a smallest diameter of the bottom flange is in a range from 5.0 mm to 9.5 mm.

6. The tyre according to claim 1, wherein a density of the studs in the tread is more than or equal to 5.6 studs/dm2.

7. The tyre according to claim 1, comprising studs in three or more rows in a direction of rotation at both sides of a centre line.

8. The tyre according to claim 1, wherein studs in the centre area have a longer pin than studs in the shoulder area.

9. The tyre according to claim 1, wherein a length of a body of the studs in the centre area is different from a length of a body of the studs in the shoulder area.

10. The tyre according to claim 1, wherein stud holes in the shoulder area are deeper than stud holes in the centre area.

11. The tyre according to claim 10, wherein a hardness of a layer of material under each stud decreases when temperature of the material increases.

12. The tyre according to claim 1, wherein a number of studs at both sides of a centre line is the same or a difference of the number of studs at both sides of the centre line is less than or equal to 10%.

13. The tyre according to claim 1, the tread comprising a mixture of two or more layers.

14. The tyre according to claim 1, wherein the stud holes comprise vulcanized stud holes.

15. The tyre according to claim 1, wherein properties of the tyre are such that a result of a road wear test according to SFS7503:2022:en is less than 1.00 g.

* * * * *